(12) United States Patent
Ho et al.

(10) Patent No.: US 11,280,506 B2
(45) Date of Patent: Mar. 22, 2022

(54) AIR-CONDITIONER UNIT

(71) Applicant: TRENDS HOME ELECTRICAL PTE. LTD., Singapore (SG)

(72) Inventors: Wee Teck Ho, Singapore (SG); Tiau Kai Tay, Singapore (SG); Chee Seng Tan, Singapore (SG)

(73) Assignee: TRENDS HOME ELECTRICAL PTE. LTD., Singapore (SG)

( * ) Notice: Subject to any disclaimer, the term of this patent is extended or adjusted under 35 U.S.C. 154(b) by 0 days.

(21) Appl. No.: 16/313,764

(22) PCT Filed: Jul. 10, 2017

(86) PCT No.: PCT/SG2017/050350
§ 371 (c)(1),
(2) Date: Dec. 27, 2018

(87) PCT Pub. No.: WO2018/013058
PCT Pub. Date: Jan. 18, 2018

(65) Prior Publication Data
US 2019/0316793 A1      Oct. 17, 2019

(30) Foreign Application Priority Data

Jul. 11, 2016   (SG) ............................ 10201605668Q

(51) Int. Cl.
*F24F 11/30*   (2018.01)
*C02F 9/00*    (2006.01)
(Continued)

(52) U.S. Cl.
CPC ............. *F24F 11/30* (2018.01); *C02F 9/005* (2013.01); *E03B 3/28* (2013.01); *F24F 3/14* (2013.01);
(Continued)

(58) Field of Classification Search
CPC .. F24F 11/30; F24F 3/14; F24F 13/222; F24F 2013/228; C02F 9/005; E03B 3/28
See application file for complete search history.

(56) References Cited

U.S. PATENT DOCUMENTS

| 6,149,801 A | 11/2000 | Giordano et al. |
| 7,897,039 B2 | 3/2011 | Koo |

(Continued)

FOREIGN PATENT DOCUMENTS

| CN | 1272801 A | 11/2000 |
| CN | 1394813 A | 2/2003 |

(Continued)

OTHER PUBLICATIONS

International Search Report and Written Opinion of International Search Authority for International Application No. PCT/SG2017/050350.

(Continued)

*Primary Examiner* — Schyler S Sanks

(57) ABSTRACT

An air-conditioner unit comprising: a temperature regulation unit having an evaporator; a condensate filtration unit arranged to receive a condensate from the evaporator, and operable to filter the condensate; wherein the air-conditioner unit comprises a controller to operate the condensate filtration unit between a plurality of purging states, the plurality of purging states comprises a first purging state wherein the condensate is purged bypassing the condensate filter unit and a second purging state wherein filtered condensate is purged.

11 Claims, 15 Drawing Sheets

(51) Int. Cl.
*E03B 3/28* (2006.01)
*F24F 3/14* (2006.01)
*F24F 13/22* (2006.01)
*F25B 49/02* (2006.01)
*F25B 41/31* (2021.01)
*B08B 9/08* (2006.01)
*C02F 1/00* (2006.01)
*C02F 1/28* (2006.01)
*C02F 1/32* (2006.01)
*C02F 1/44* (2006.01)

(52) U.S. Cl.
CPC ............ *F24F 13/222* (2013.01); *F25B 41/31* (2021.01); *F25B 49/02* (2013.01); *B08B 9/083* (2013.01); *C02F 1/001* (2013.01); *C02F 1/283* (2013.01); *C02F 1/32* (2013.01); *C02F 1/444* (2013.01); *C02F 2001/007* (2013.01); *C02F 2307/10* (2013.01); *F24F 2013/228* (2013.01)

(56) References Cited

U.S. PATENT DOCUMENTS

| | | | |
|---|---|---|---|
| 2005/0139552 A1 | 6/2005 | Forsberg et al. | |
| 2008/0017571 A1 | 1/2008 | Koo | |
| 2009/0077992 A1* | 3/2009 | Anderson | B01D 5/009 62/291 |
| 2011/0283730 A1 | 11/2011 | Tudor | |
| 2013/0047655 A1 | 2/2013 | White | |
| 2013/0312451 A1* | 11/2013 | Max | F28D 1/05333 62/498 |
| 2015/0027144 A1* | 1/2015 | Lee | F24F 11/30 62/80 |
| 2015/0033779 A1 | 2/2015 | Seggerman | |
| 2015/0308732 A1* | 10/2015 | Lee | F24F 3/14 62/291 |
| 2016/0047563 A1 | 2/2016 | Kim et al. | |
| 2016/0089616 A1 | 3/2016 | Maruyama | |
| 2017/0291141 A1* | 10/2017 | Dunham | C02F 9/005 |

FOREIGN PATENT DOCUMENTS

| | | |
|---|---|---|
| CN | 101109560 A | 1/2008 |
| CN | 201096396 Y | 8/2008 |
| CN | 201621831 U | 11/2010 |
| CN | 102645060 A | 8/2012 |
| CN | 101929179 B | 10/2012 |
| CN | 203949333 U | 11/2014 |
| CN | 104266292 A | 1/2015 |
| CN | 206989352 U | 2/2018 |
| JP | 2002039567 A | 2/2002 |
| JP | 2008024295 A | 2/2008 |
| JP | 2008256285 A | 10/2008 |
| JP | 2011058690 A | 3/2011 |
| JP | 2015200491 A | 11/2015 |
| KR | 20100109696 A | 10/2010 |
| KR | 20130009844 A | 1/2013 |
| TW | M562943 U | 7/2018 |
| WO | WO-9907456 A1 | 2/1999 |
| WO | WO-2006029249 A2 | 3/2006 |
| WO | WO-2011010382 A1 | 1/2011 |
| WO | WO-2011063199 A2 | 5/2011 |
| WO | WO-2011146428 A2 | 11/2011 |
| WO | WO-2018013058 A1 | 1/2018 |

OTHER PUBLICATIONS

International Preliminary Report on Patentability for International Application No. PCT/SG2017/050350.

* cited by examiner

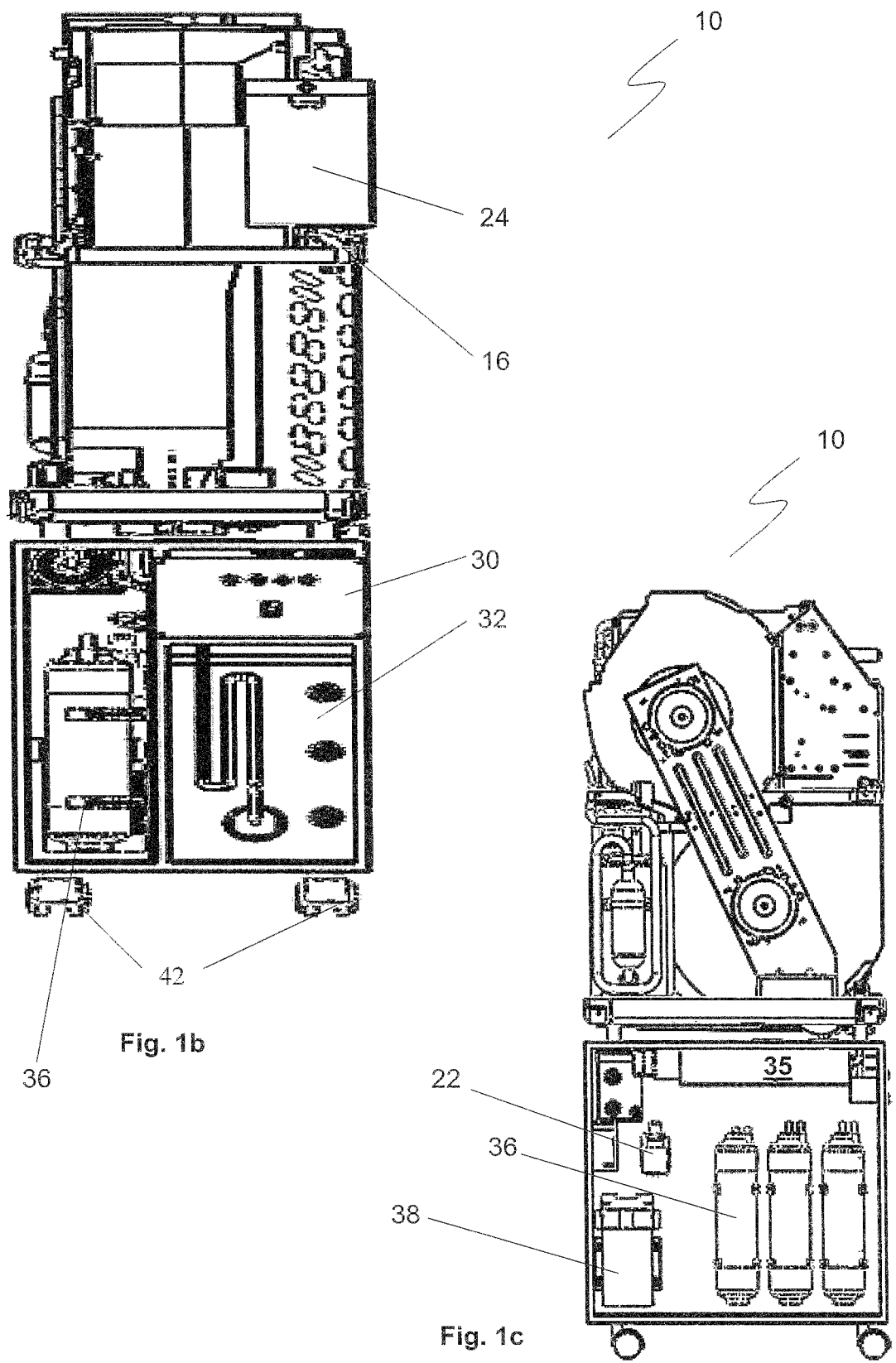

| Input | Output |
|---|---|
| Dispensing push button (BN) | Filter pump (FP) / UV1 |
| Purging push button (PBN) | UV2 |
| Collection tank high level (CH) | Dispensing pump (DP) |
| Collection tank low level (CL) | Collection tank purge valve (TPV) |
| Storage tank high level (SH) | Dispensing purge valve (DPV) / Purging relay (PR) |
| Storage tank mid level (SM) | Dispensing valve (DV) |
| Storage tank low level (SL) | Overflow relay (OR) / Full tank signal (FS) |
| Flow meter (FM) | Empty tank signal (ES) |
| | Ready to dispense signal (RS) |

Fig. 4

| Conditions | Output | Output | Details |
|---|---|---|---|
| 1.1 | FP/UV1<br>Filter pump/In-line UV | ON | CH=1 and SM=0<br>Collection level High; Storage Mid-Level |
| 1.2 | | OFF | SH=1<br>Storage level High |
| 1.3 | | | CL=0<br>Collection Low level |
| 2.1 | DP<br>Dispensing pump | ON | BN=1 and ES=0 and Purging stage=0<br>Dispensing push button ON;<br>Empty Tank OFF<br>Normal dispensing stage |
| 2.2 | | | CH=1 and Purging stage=1<br>Collection level high<br>Completed start-up purging |
| 2.3 | | | SH=1 and Purging stage=2<br>Storage level High<br>Completed filter purging |
| 2.4 | | OFF | BN=0 and Purging stage=0<br>Dispensing push button OFF<br>Normal dispensing stage |
| 2.5 | | | ES=1 and Purging stage=0<br>Empty tank ON<br>Normal dispensing stage |
| 2.6 | | | CL=0 and Purging stage=1<br>collection Low level |
| 2.7 | | | SL=0 and Purging stage=2<br>Storage low level |
| 3.1 | UV2<br>Submersible UV | ON | SL=1<br>Storage level at least Low |
| 3.2 | | OFF | SL=0<br>Storage low level |
| 4.1 | TPV<br>Collection purging solenoid valve | ON | CH=1 and Purging stage=1<br>Collection high level<br>Start-up purging stage |
| 4.2 | | OFF | CL=0<br>Collection Low level |
| 4.3 | | | Purging stage not 1 |
| 5.1 | DPV/PR<br>Dispensing purge valve | ON | CH=1 and Purging stage=1<br>Collection High level<br>Start-up purging stage |
| 5.2 | | | SH=1 and Purging stage=2<br>Storage High level<br>Filter purging stage |
| 5.3 | | OFF | Purging stage=0<br>Normal dispensing stage |
| 5.4 | | | CL=0 and Purging stage=1<br>Collection Low level<br>Start-up purging stage |
| 5.5 | | | SL=0 and Purging stage=2<br>Storage Low level<br>Filter purging stage |
| 6.1 | DV<br>Water dispensing valve | ON | BN=1 and ES=0 and Purging stage=0<br>Dispensing push button ON<br>Empty tank OFF |

Fig. 5a

| | | | |
|---|---|---|---|
| | | | Normal dispensing stage |
| 6.2 | | OFF | Purging stage not 0 |
| | | | Start-up purging stage; filter purging stage |
| 6.3 | | | BN=0 and Purging stage=0 |
| | | | Dispensing push button OFF |
| | | | Normal dispensing stage |
| 6.4 | | | ES=1 |
| | | | Empty tank ON |
| 7.1 | ES<br>Empty Tank signal | 1 | SL=0 and Purging stage=0 |
| | | | Storage Low level |
| | | | Normal dispensing |
| 7.2 | | 0 | SM=1 and Purging stage=0 |
| | | | Storage Mid-level |
| | | | Normal dispensing |
| 8.1 | OR/FS<br>Overflow / Full tank signal | ON | CH=1 and SH=1 |
| | | | Collection High level |
| | | | Storage High level |
| 8.2 | | OFF | CH=0 |
| | | | Collection Low level |
| 9.1 | RS<br>Ready to dispense | ON | ES=0 and Purging stage=0 |
| | | | Empty tank OFF |
| | | | Normal dispensing |
| 9.2 | | OFF | Purging stage=0 |
| | | | Normal dispensing |
| 9.3 | | | ES=1 |
| | | | Empty tank ON |
| 10.1 | Purging stage | 0 | FM>Y |
| | | | Normal dispensing |
| | | | Flow meter reading > (start-up + filters purging volume) |
| 10.2 | | 1 | FM<X |
| | | | Start-up purging |
| | | | Flow meter reading < start-up purging volume |
| 10.3 | | 2 | PBN=1 |
| | | | Replacement of new filters purging |
| | | | Purging push button ON |
| 10.4 | | 2 | FM>X and FM<Y and Purging stage=1 |
| | | | Filters purging |
| | | | Flow meter reading > start-up volume |
| | | | Flow meter reading < filter purging volume |
| | | | Purging stage 1 has to be completed |
| 10.5 | | 3 | FM>Z and Purging stage=0 |
| | | | Reaching the span life of filters |
| | | | Flow meter reading > 6000L volume |
| | | | Normal dispensing condition |

Fig. 5b

AIR-CONDITIONER UNIT

FIELD OF THE INVENTION

The invention relates to an improved air-conditioner unit. The improved air-conditioner unit may include, but is not limited to, a portable air-conditioner capable of providing multiple functions, and will be described in such context.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Air-conditioner units or air-conditioning systems are used primarily to regulate or adjust temperature in an enclosed area, such as a room. In the operation of such air-conditioner units or air-conditioning systems, heat energy, amongst others, is generated, dissipated to the environment and can contribute to global warming. In addition, the heat energy generated and dissipated is wasted because it is not utilized to do any useful work.

One of the problems associated with global warming and industrialization is the rapid decrease in the supply of drinkable water. Such decrease in drinkable water poses a huge problem especially to remote or rural regions where delivery of drinkable water is difficult.

Increasingly, there exists multi-functional air-conditioner units, some of which claim to be able to produce drinkable water. However, such multi-functional air-conditioner units are typically de-humidifiers and do not regulate temperature. In addition, even if the water produced is fit for drinking, there appears to be no proper maintenance to consistently ensure the quality of the water produced, especially when tubes/pipes within the air-conditioner units may accumulate impurities over time.

Typically, air-conditioner units require exhaust pipes or conduits as an outlet to remove excess condensate water and to facilitate heat dissipation. In recent improvements, air-conditioner units comprise models that do not require an exhaust pipe. However, such models typically have limited cooling capabilities of 3000 British Thermal Unit (BTU) and below. Moreover, these models blow out cold air and the heat is dissipated to the environment via good ventilation or rapid dissipation of the heat into the surrounding air. However, for relatively smaller spaces, where the ventilation conditions are not ideal, an exhaust pipe will still be required for the hot air to be pumped out of the room.

In light of the above, there therefore exists a need to provide an air-conditioner unit that is more environmentally friendly in the sense that it is at least able to harness part of the heat energy dissipated and mitigate the problem of drinkable water supply or supply of water that is fit for consumption, and/or improve on existing air-conditioner units at least in part.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

Throughout the specification, unless the context requires otherwise, the word "comprise" or variations such as "comprises" or "comprising", will be understood to imply the inclusion of a stated integer or group of integers but not the exclusion of any other integer or group filter of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The invention seeks to provide a multi-functional air-conditioner, which may be portable. In some embodiments the air-conditioner unit comprises a temperature regulation unit integrated with a water filtration or a water purifier unit, wherein the water filtration or purification unit utilizes at least the condensed water obtained from the evaporator of the temperature regulation unit for filtration and purification. The air-conditioner unit may further comprise a water dispenser for storage of filtered water that is deemed fit for human consumption. Depending on environmental and operating conditions, the filtered water may be fit for human drinking.

Control of the multi-functional portable air-conditioner may be realized in the form of one or more electronic controllers. In the implementation of logic for control of the air-conditioner unit, the different functions associated with heating, cooling or refrigeration, filtration of water, may be implemented with different priority associated with it. Further, control of such functions may be optimized. Non-exhaustive factors that may affect the prioritization and optimization include: temperature of the environment, temperature of the condenser, temperature of the evaporator coils, water temperature at various locations, flow rate of condensed water etc.

In accordance with one aspect of the invention, there is an air-conditioner unit comprising: a temperature regulation unit having an evaporator; a condensate filtration unit arranged to receive a condensate from the evaporator, and operable to filter the condensate; wherein the air-conditioner unit comprises a controller to operate the condensate filtration unit between a plurality of purging states, the plurality of purging states comprises a first purging state wherein the condensate is purged bypassing the condensate filter unit and a second purging state wherein filtered condensate is purged.

Preferably, the temperature regulation unit and condensate filtration unit are shaped and dimensioned such that the condensate filtration unit is arranged below the temperature regulation unit.

Preferably, the condensate filtration unit is a water filtration unit and comprises a collection tank, a dispensing tank and a plurality of filters arranged to receive the condensate from the collection tank and direct filtered condensate to the dispensing tank.

Preferably, in the first purging state, the condensate from the collection tank is sent directly to a dispenser pump bypassing the plurality of filters, and in the second purging state, the condensate is sent to the plurality of filters.

Preferably, the collection tank comprises a first outlet and a second outlet, such that in the first purging state, the condensate from the collection tank is sent directly to a dispenser pump for purging via the first outlet, and in the second purging state, the condensate from the collection tank is directed to the plurality of filters via the second outlet.

Preferably, the controller is an electronic controller that operates to receive the following as inputs: a. a level of condensate stored in the collection tank; and b. a level of filtered condensate stored in the dispensing tank, the electronic controller operable to provide an output corresponding to the activation or opening of at least one valve.

Preferably, the condensate filtration unit comprises a flow meter operable to obtain a total volume of condensate passing through the flow meter from a preset time as another input.

Preferably, the inputs are binary inputs.

Preferably, the output is a binary output.

Preferably, if the total volume of condensate passing through the flow meter is less than a first pre-fixed amount X, the controller operates the condensate filtration unit in the first purging state.

Preferably, if the total volume of condensate passing through the flow meter is more than the first pre-fixed amount X but less than a second pre-fixed amount Y, the controller operates the condensate filtration unit in the second purging state.

Preferably, if the total volume of condensate passing through the flow meter is more than a third pre-fixed amount Z, the controller operates the condensate filtration unit in the third purging state corresponding to a maintenance mode and a prompt to a user to change the condensate filter unit.

Preferably, if the total volume of condensate passing through the flow meter is more than the second pre-fixed amount Y but less than the third pre-fixed amount Z, the controller operates the condensate filtration unit in a dispensing state.

Preferably, the air-conditioner unit further comprises a first ultra-violet source that operates to disinfect the condensate in the collection tank.

Preferably, the air-conditioner unit further comprises a second ultra-violet source that operates to disinfect the filtered condensate in the dispensing tank.

Preferably, the temperature regulation unit comprises a second electronic controller and an electronic expansion valve throttling device, the second electronic controller operates to regulate the amount and state of refrigerant flowing pass the expansion valve throttling device.

Preferably, the second electronic controller is operable to switch the temperature regulation unit between a full feature mode and a priority mode.

Preferably, the priority mode comprises a cooling priority mode, a water dispensing priority mode, and a refrigeration priority mode.

Preferably, the temperature regulation unit comprises a refrigerator, the evaporator arranged to be connected to the refrigerator such that heat energy absorbed by the evaporator results in the cooling of the refrigerator.

Preferably, the air-conditioner unit further comprises a dispenser arranged to receive filtered condensate from the condensate filtration unit.

Preferably, the dispenser is arranged to have a first compartment for storage of hot water and a second compartment for storage of cold water.

Preferably, the first compartment comprises a humidifier.

Preferably, the temperature regulation unit further comprises a tray for collecting the condensate from the evaporator, and the condensate filtration unit further comprises at least one conduit connected to the tray and arranged to receive the condensate from the tray, and a filter unit arranged to receive and filter the condensate from the at least one conduit.

In accordance with another aspect of the invention, there is a condensate filtration unit for use with a portable air-conditioner unit, comprising at least one conduit connected to a condensate container and arranged to receive condensate from the condensate container; the condensate filtration unit further comprising a filter unit arranged to receive and filter the condensate; wherein the condensate filtration unit comprises a controller to operate the condensate filtration unit between a plurality of purging states, the plurality of purging states comprises a first purging state wherein condensate is purged bypassing the filter unit and a second purging state wherein the filtered condensate is purged.

Preferably, the filter unit comprises a sediment filter, a carbon filter, an ultrafiltration filter, an ultraviolet filter, or any combination thereof.

In accordance with another aspect of the invention, there is an air-conditioner unit comprising: a compressor for compressing a refrigerant; a first heat exchanger arranged to receive compressed refrigerant from the compressor; a water source arranged to pass water to the first heat exchanger to remove heat from the compressed refrigerant; the water source further comprising a compartment arranged to store water heated by the compressed refrigerant; an electronic expansion valve-throttling device arranged to receive compressed refrigerant flowing out of the first heat exchanger; and an electronic controller operable to control the electronic expansion valve-throttling device to regulate the quantity of compressed refrigerant flowing through the expansion valve throttling device via adjustments of pressure and temperature.

Preferably, the electronic controller is pre-programmed to regulate the compressed refrigerant based on a plurality of modes depending on different priority.

Preferably, the plurality of modes comprise two or more of the following: a temperature regulation mode, a water dispensing mode, a refrigeration mode.

Preferably, the air-conditioner unit further comprises an evaporator arranged at the output of the expansion valve-throttling device.

Preferably, the air-conditioner unit further comprises a refrigerator arranged to be connected to an outlet of the evaporator.

Preferably, an outlet of the refrigerator is connected to an inlet of the first heat exchanger.

In accordance with another aspect of the invention, there is a method for obtaining condensate from an air-conditioner unit comprising the steps of: a. collecting a condensate from an evaporator; b. directing the condensate via at least one conduit to a condensate filtration unit, the condensate filtration unit comprises a filter unit; c. operating the condensate filtration unit between a first purging state and a second purging state; wherein in the first purging state, the condensate is purged bypassing the filter unit; and wherein in the second purging state, the condensate is directed to pass the filter unit, and is purged.

In accordance with another aspect of the invention, there is an air-conditioner unit comprising: a compressor for compressing a refrigerant; a first heat exchanger arranged to receive the refrigerant from the compressor; an electronic expansion valve-throttling device arranged to receive refrigerant flowing out of the first heat exchanger; an electronic controller operable to control the electronic expansion valve-throttling device to regulate the temperature and pressure of the refrigerant; an evaporator arranged to receive the refrigerant from the electronic expansion valve-throttling device; a tray arranged to collect water condensate from the evaporate, and to direct the water condensate to a water source; wherein the air-conditioner unit is arranged to operate in different modes depending on a quantity of water inside the water source.

Preferably, the air-conditioner unit is arranged to operate in a dehumidifying mode to generate the water condensate when the quantity of water inside the water source is below a predetermined low level.

Preferably, the air-conditioner unit is arranged to operate in a cooling mode when the quality of water inside the water source is equal to or above a predetermined medium level.

Preferably, the water source is arranged to pass water into a filtration unit.

Preferably, the air-conditioner unit is arranged to operate in a drinking water mode when the quantity of water inside the water source is above a predetermined low level.

Preferably, the filtration unit comprises a sediment filter, a carbon filter, an ultrafiltration filter and an ultraviolet filter, or any combination thereof.

Preferably, the filtration unit is arranged to pass filtered water to a water heater.

Preferably, the water source is arranged to pass water to the first heat exchanger to remove heat from the refrigerant.

Preferably, the first heat exchanger is configured to be connected to a humidifier/atomizer, wherein the air-conditioner unit is arranged to operate in an air cooler fan mode when the quantity of water inside the water source is above a predetermined high level.

Preferably, the evaporator is arranged to be connected to a second heat exchanger, wherein the refrigerant flows from the evaporator into the second heat exchanger and evaporates further inside the second heat exchanger.

Preferably, the second heat exchanger is arranged to receive water from the water source, and to generate cooled water.

Preferably, the second heat exchanger is arranged to direct the cooled water into a fridge, wherein the air-conditioner is arranged to operate in a fridge mode when the quantity of water inside the water source is above a predetermined low level.

BRIEF DESCRIPTION OF DRAWINGS

The present invention will be described, by way of example only, with reference to the accompanying drawings, in which:

FIGS. 1a to 1c illustrate an air-conditioner unit in various perspective views in accordance with various embodiments. In particular, FIG. 1b and FIG. 1c are the side views with respect to FIG. 1a;

FIG. 4 is a table correlating the input and output devices of the water filtration unit for electronic control;

FIG. 5 is a table illustrating various output control conditions;

PREFERRED EMBODIMENTS OF THE INVENTION

Throughout the specification, the term 'consumption' refers to filtered water that can be utilized by humans for a variety of purposes, including, but not limited to, drinking. Accordingly, consumption may include filtered water utilized for washing, cleaning, bathing etc.

Further throughout the specification, the term 'temperature regulation unit' may be understood to comprise a conventional air-conditioner unit having heating and cooling functions.

Further, throughout the specification, the term 'water' is understood to include liquids comprising water as its major constituent.

Further, throughout the specification, the term 'condensate' is understood to include water which is condensed on a part of the air-conditioner unit, such as on one or more evaporator coils during operation of the air-conditioner unit.

Further, throughout the specification, the term "filter unit" refers to a general class of at least one, but typically one or more condensate filters or a specific class of one or more water filters.

Figure 1A:
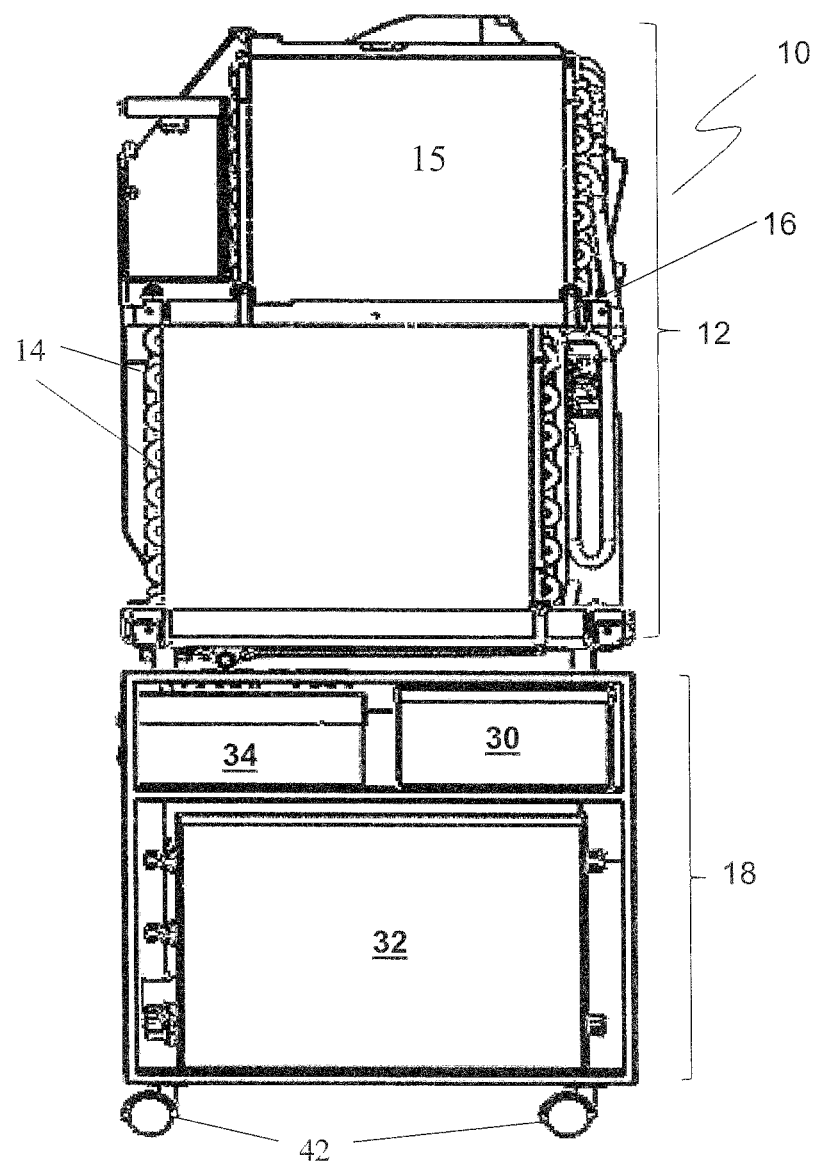
Figure 2A:
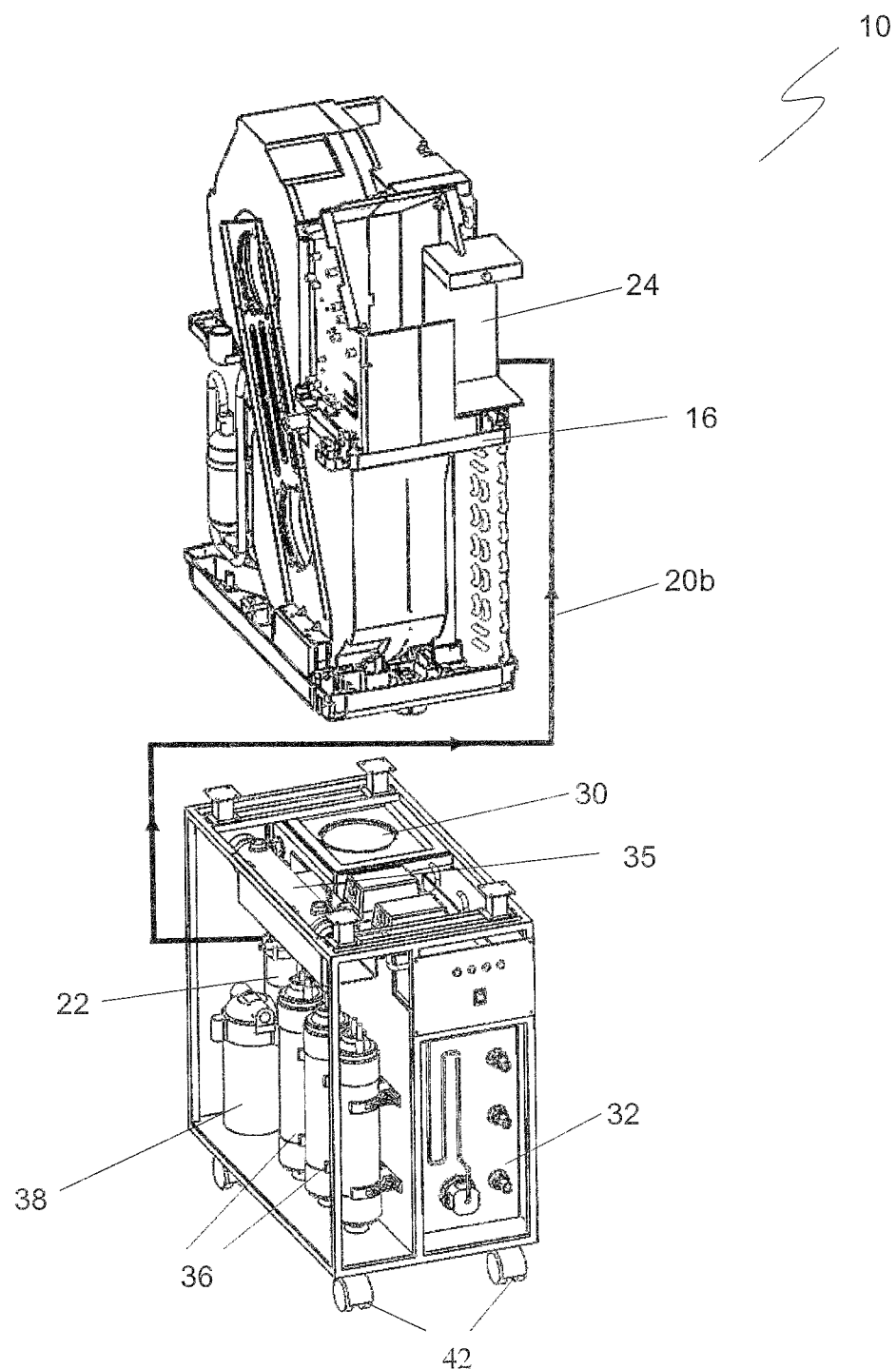
FIGS. 2a and 2b are exploded views of the air-conditioner unit showing the temperature regulation unit and the water filtration unit and how they are connected.
Figure 2B:
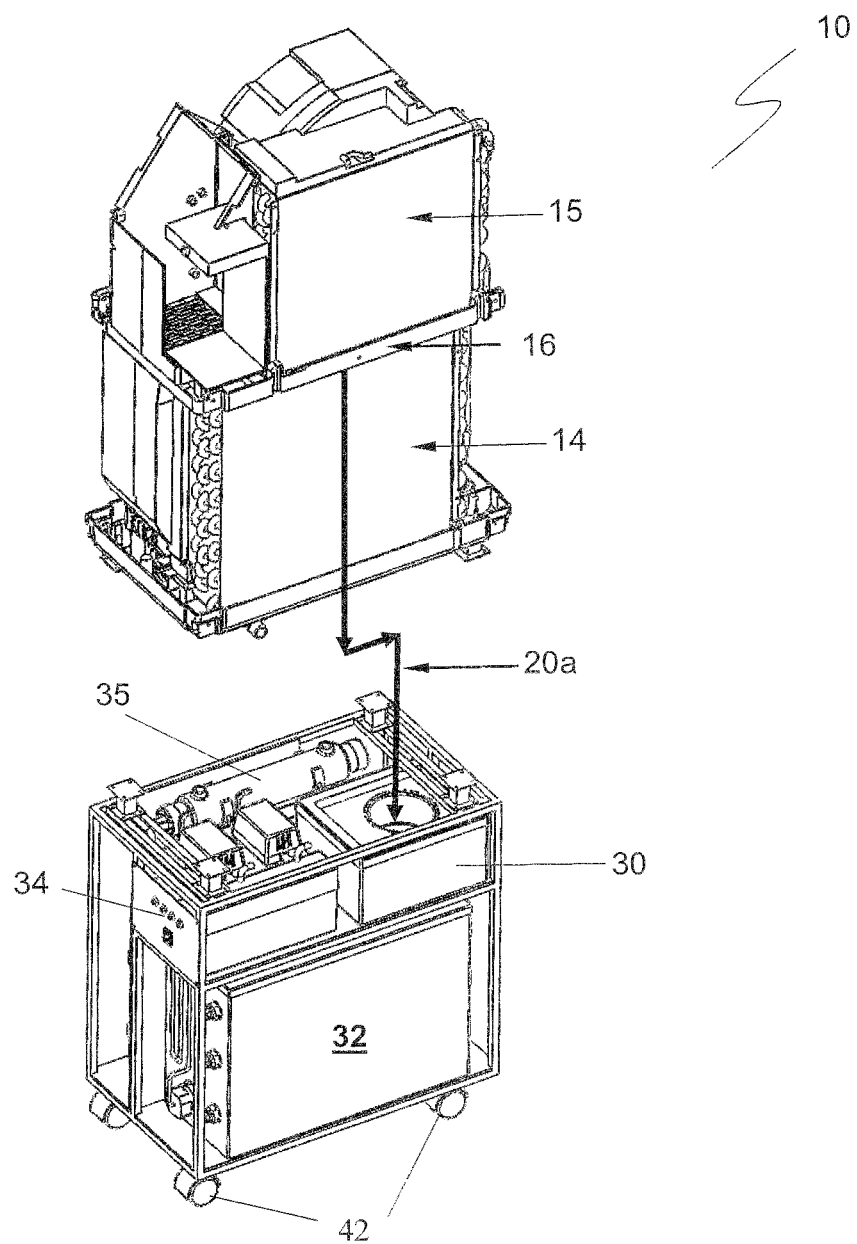

In accordance with an embodiment of the invention and with reference to FIG. 1, there is an air-conditioner unit 10 comprising a temperature regulation unit 12 having an evaporator 15. The air-conditioner unit 10 may be, but is not limited to, a portable air-conditioner unit. The evaporator may comprise one or more evaporator coils 15. The air-conditioner unit 10 may also comprise a condenser 14 that may comprise one or more condenser coils 14.

There are various ways to organize the components of the temperature regulation unit 12. As shown in the embodiment of FIG. 1, the condenser coils 14 are located below the evaporator coils 15. In some other embodiments, the condenser coils 14 and the evaporator coils 15 are arranged to side-by-side (i.e., at the same level), accordingly minimizing the height of the temperature regulation unit 12.

A condensate container such as a tray 16 is positioned at a suitable location relative to the evaporator 15 to collect condensed liquid (such as water) from the evaporator coils 15 that arise from the operation of the temperature regulation unit 12—as the refrigerant evaporates inside the evaporator coils 15, the temperature of the evaporator 15 cools down, causing, for example gaseous water molecules, in the ambient air to condense into liquid droplets (e.g., condensed water).

Condensed water may be collected via return pipe to a water filtration unit 18 (shown in FIG. 7). The tray 16 may comprise an outlet having one or more valves disposed therein, such that when a pre-determined amount of water has been stored in the tray, the valve(s) open to direct the condensed water from the tray 16 to a condensate filtration unit 18. The condensate filtration unit 18 may be in the form of a water filtration unit 18.

The water filtration unit 18 is arranged to receive the condensate (which may be in the form of condensed water) from the tray 16 for filtration or purification. At least one conduit 20a may run between the water filtration unit 18 to the tray 16, the at least one conduit 20a arranged to receive condensed water from the tray 16. In some embodiments, the at least one conduit 20a may be a metallic pipe, such as a stainless steel pipe that complies with the necessary regulatory requirements such as the Food and Drug Administration (FDA) to ensure that the condensed water passing through the conduit 20a is not contaminated by any impurity/impurities in an inner surface of the conduit 20a, such as rust. In other embodiments, the at least one conduit 20a may be made of polytetrafluoroethylene (PTFE). In general, the at least one conduit 20a is non-corrosive and preferably lightweight and durable.

In some embodiments wherein the evaporator coils 15 are located above the condenser coils 14, instead of using a conduit, the condensate from the tray 16 is directed to the water filtration unit 18 by directing the condensate collected in the tray 16 to directly pass through condenser coils 14 into the water filtration unit 18. When the condensate flows down the condenser coils 14, the condensate also takes some heat away from the condenser coils, improving the efficiency of the air-conditioner unit. In some embodiments, another tray (not shown) is placed at the bottom of the condenser coils 14 to collect the condensate that passes through the condenser coils 14. In this arrangement, there is no need to use conduit/pipe to direct the condensate from the temperature regulation unit 12 to the water filtration unit 18.

In some embodiments, a dispenser pump 22 may be positioned at an output of the water filtration unit 18 to pump filtered water back to the temperature regulation unit 12 for storage and dispensation. In some embodiments, the filtered water may be fit for consumption. In some embodiments, a water dispenser 24 is arranged to receive filtered water from the dispenser pump 22 via a conduit 20b for storage and dispensation.

With reference to FIG. 1a to FIG. 1c and FIG. 2a and FIG. 2b, which shows an embodiment of the invention in different perspective views, the temperature regulation unit 12 and water filtration unit 18 are shaped and dimensioned such that the water filtration unit 18 is arranged below the temperature regulation unit 12. Such an arrangement of the temperature regulation unit 12 and water filtration unit 18 achieves regularity in shape for ease of deployment and transportation. The tray 16 is arranged at the bottom of the evaporator coils 15. A dimension of the tray 16, for example the length or width of tray 16, may correspond to a dimension of the evaporator coils 15 such as to maximize the collection of condensed water.

The interface and joint between the temperature regulation unit 12 and water filtration unit 18 may be via snug fit arrangements as known to a skilled person and will not be elaborated further. In some embodiments, the temperature regulation unit 12 and water filtration unit 18 may be welded or joined together permanently as a single integrated unit.

The water filtration unit 18 may comprise a collection tank 30 to store received condensed water from the at least one conduit 20a. In some embodiments, the collection tank 30 may comprise a water quality sensor to measure the quality of water collected in the collection tank 30. The water filtration unit 18 may further comprise a dispensing tank 32 for storage of filtered water before pumping to the water dispenser 24 via a conduit 20b. In some embodiments, the dispensing tank 32 may also comprise sensors to measure the quality of the filtered water stored in the dispensing tank 32. Nevertheless, in some embodiments, the water filtration unit 18 may be arranged to directly receive the condensate from the temperature regulation unit 12 via the at least one conduit 20a, without relying on any intermediate component (e.g., the collection tank 30). In some embodiments, the filtered water may be directly pumped into the water dispenser 24 without going through any intermediate component (e.g., the dispensing tank 32).

In various embodiments, the air-conditioner unit 10 comprises a controller 34 to switch the condensate (water) filtration unit 18 between a purging state and a dispensing state. The controller 34 further controls the flow of condensed water within the water filtration unit 18. Such control may be achieved with the deployment of valves to direct the flow of the condensate. The at least one controller 34 may be an electronic controller 34 with necessary circuitry to implement control logic such as to control the flow of water within the water filtration unit 18. The circuitry may be housed within a box so that it is isolated from the rest of the water filtration unit 18. In some embodiments, the collection tank 30 has a capacity of 5 to 15 liters.

A ultra-violet source (UV source) 35 may be arranged to remove bacteria, germs and other organisms in the condensed water stored in the collection tank 30. Such an arrangement provides a disinfectant function after filtration via a filter unit 36, which may be in the form of a water filter unit 36. The UV source 35 may be positioned adjacent to the filter unit 36. Where UV source 35 is deployed, care should be taken to ensure that the material forming the collection tank 30, dispensing tank 32 and filter unit 36 can withstand UV radiation without corrosion. An example of a material for forming the collection tank 30, dispensing tank 32 and/or the filter unit 36 is stainless steel.

To achieve compactness and a desired form factor, some components of the air-conditioner unit 10 may be stacked above other components. As illustrated in FIG. 1 and FIG. 2, the collection tank 30, electronic controller 34, and UV source 35 may be arranged to be stacked on top of the dispensing tank 32 and filters 36.

In some embodiments, an additional UV source 39 may be positioned in the dispensing tank 32. In such an arrangement, the additional UV source 39 is a submersible UV source. The arrangement with the UV source 39 seeks to minimize or prevent build-up of bacteria in the filtered water stored within the dispensing tank 32.

As shown in FIG. 1 and FIG. 2, the air-conditioner unit 10 may comprise rollers 42 for enhancing mobility of the air-conditioner unit 10. Such rollers 42 may be attached or affixed to the base of the air-conditioner unit 10.

Figure 3:
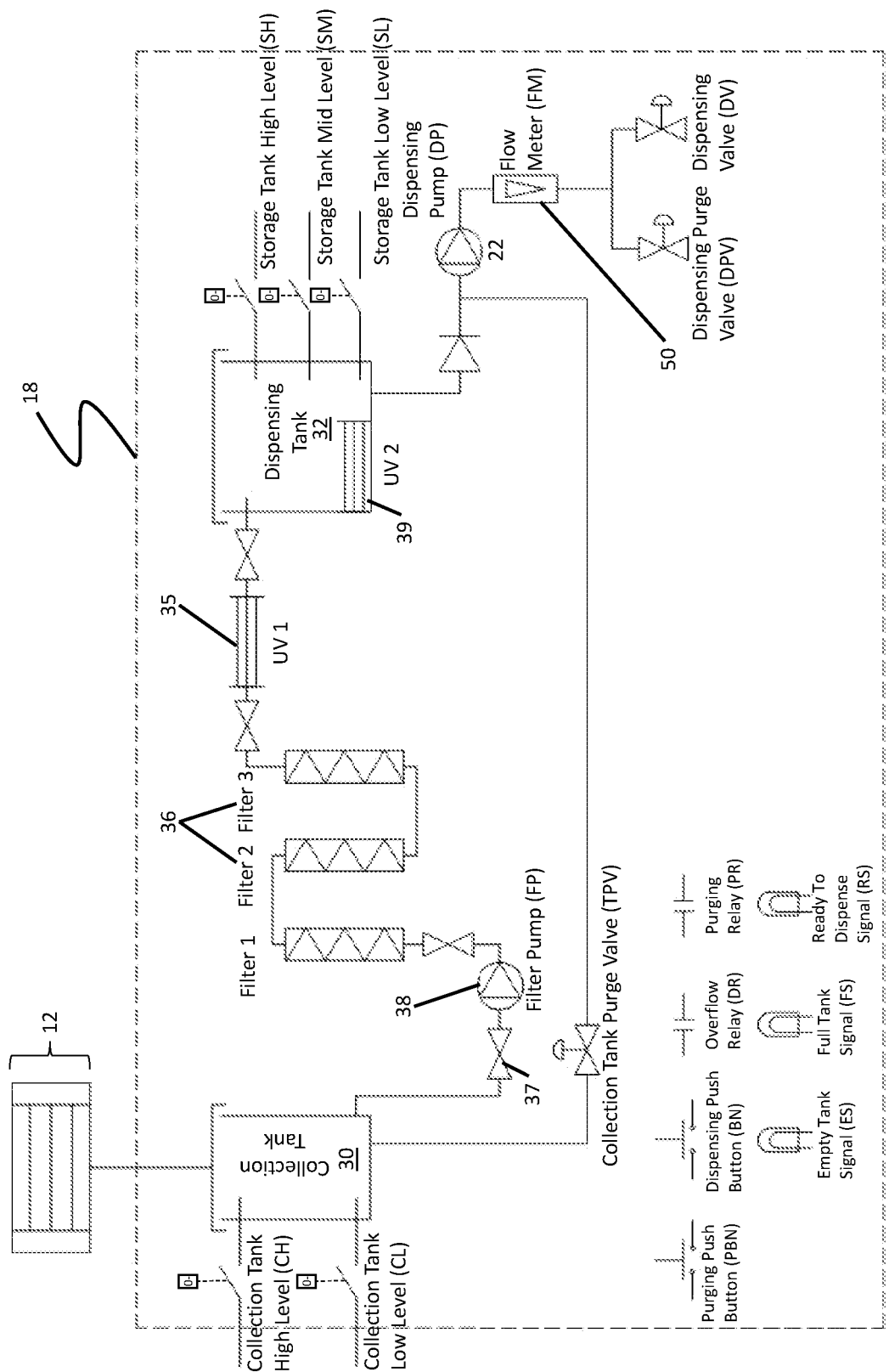
FIG. 3 illustrates a system diagram of the water filtration unit.

Referring to FIG. 3, the condensed water passing through the at least one conduit 20a is output to the collection tank 30 for storage. Depending on purging or dispensing operation modes which will be subsequently elaborated, condensed water collected in the collection tank 30 may be either directed to a plurality of water filter unit 36 via a filter pump 38 and valve 37, or may be directed to the dispenser pump 22, by-passing the plurality of water filters 36. The opening/activation and closing/deactivation of the valve 37 and filter pump 38 are controlled by the electronic controller 34. The dispenser pump 22 may be connected to a flow meter (FM) or flow sensor 50. The flow meter 50 is in turn connected to a dispensing purge valve (DPV) and a dispensing valve (DV). When the dispensing purge valve DPV is activated, water from the collection tank 30 or dispensing tank 32 is purged and not pumped to the dispensing tank 32. When the dispensing valve is activated or opened, filtered water, which may be fit for consumption and/or drinking, is directed from the dispensing tank 32 and pumped via the dispenser pump 22 to the water dispenser 24 for storage pending consumption. The plurality of filters or filter unit 36 should preferably be able to filter the condensed water to an extent that the water is fit for a certain level of consumption. In some embodiments, the filtered water is fit for drinking. In the embodiments where filtered water is fit for drinking, the electronic controller 34 may operate to purge the water not fit for drinking such that the water will not be directed back to the water dispenser 24. The purged water may however be utilized for one or more other purpose(s).

The electronic controller 34 operates to receive input electronic signals from a plurality of sensors and/or actuators to provide corresponding output(s). The plurality of sensors or actuators may include sensors for measuring the water level of the controller tank 30 and dispensing tank 32; flow rate/total volume of water dispensed and/or purged obtained from the flow meter 50; and input obtained from a user of the air-conditioner unit 10 via manual push buttons.

FIG. 4 shows a correlation table between the inputs provided to the electronic controller 34 and the output generated by the electronic controller 34. The inputs and outputs may be in the form of binary electronic signals having off state corresponding to a state '0'; and an on state corresponding to a state '1'. As an example, when the collection tank high level (CH) is detected to be '1', i.e. when water in the collection tank high level (CH) is at or above a predetermined level, the dispenser pump (DP) 22 is activated. When the collection tank level is at a low level (CL), the collection tank purge valve (TPV) is opened. Another input that can be taken is the mid-level of the dispensing (storage) tank 32. When the storage tank mid-level (SM) is detected to be '1', i.e. when water in the dispensing tank 32 is at or above a predetermined level, the dispensing valve (DV) is activated to allow water to be pumped to the water dispenser 24.

The electronic controller 34 controls the condensate filtration unit 18 to operate between one or more purging states, and a dispensing state. It is to be appreciated that the purging states correspond to a plurality of states:— a. A first purging state where collected condensate is purged without passing through the filter unit 36;

b. A second purging state, where collected condensate are passed through the filter unit 36 and purged.

The electronic controller 34 comprises a processor unit and the necessary circuitry (not shown) to implement the logical control associated with switching on or off the valves, pumps and UV sources 35, 39. Examples of the one or more purging states include:

a. purging of water in the collection tank 30;

b. purging of filtered water in the dispensing tank 32;

The dispensing state corresponds to the filtered water, which is stored in the dispensing tank 32, being directed to the water dispenser 24 via the dispenser pump 22 and dispensing valve DV.

The purging states are utilized for the first usage of the air-conditioner units where condensed water (the condensate) is utilized to remove impurities or particles in the collection tank 30, and in a maintenance mode where the collection tank 30, dispensing tank 32 and the filters are cleaned.

Figure 6A:
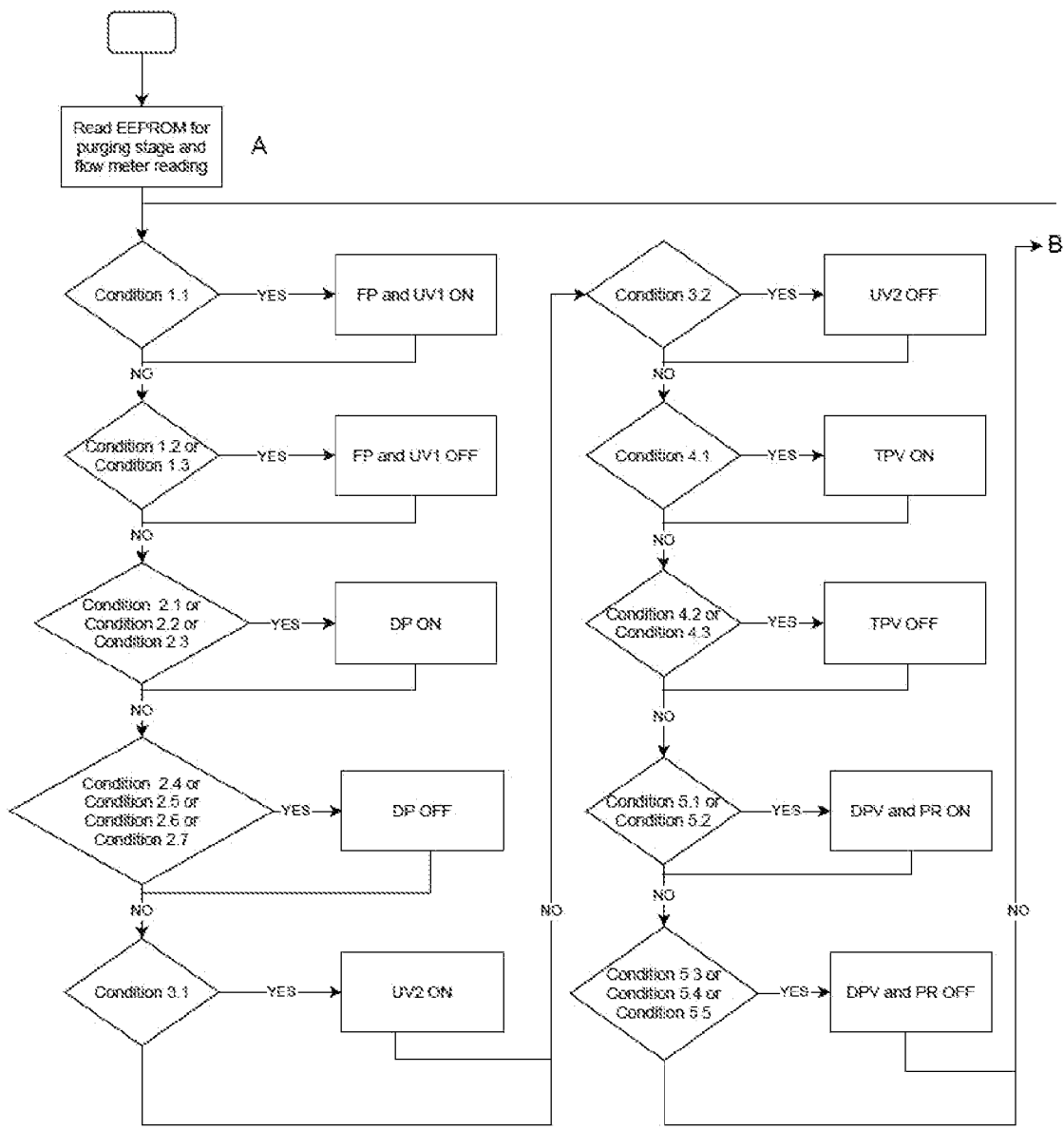
FIG. 6 is a flowchart showing the logic associated with the electronic controller for controlling the air-conditioner unit based on various output control conditions.
Figure 6B:
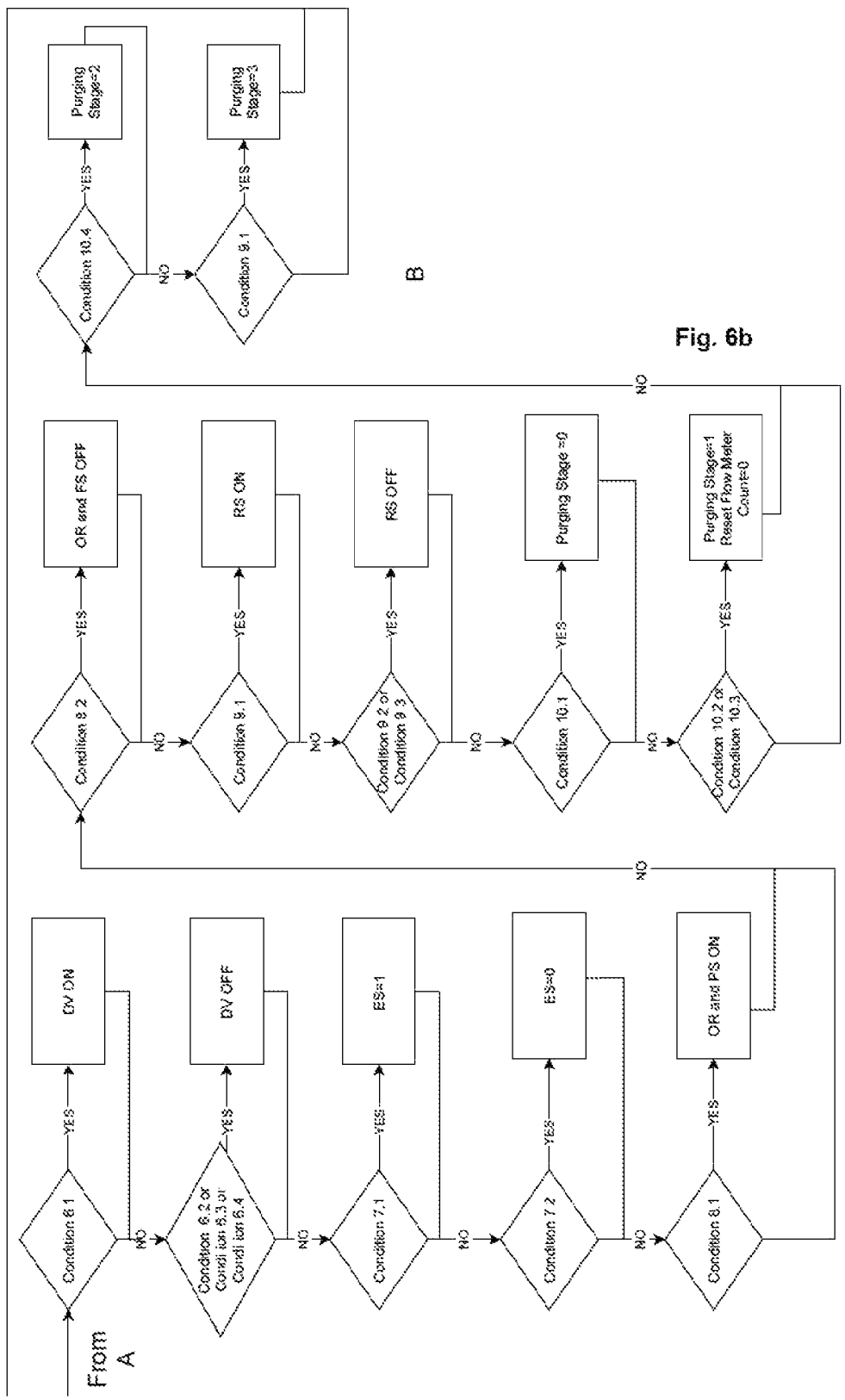

FIG. 5 and FIG. 6 show a control flow chart and a table of detailed output control conditions for the control of the condensate filtration unit 18. The table of output control conditions detail how each output component can be switched between the 'ON' and 'OFF' state via one or a combination of inputs.

Condition 1.1 to condition 1.3 correspond to the conditions for switching on or off the filter pump 38 and UV source 35; condition 2.1 to condition 2.7 correspond to the conditions for switching on or off the dispensing pump 22; condition 3.1 and 3.2 correspond to the conditions for switching on or off the UV source 39; conditions 4.1 to 4.3 correspond to the conditions for switching on or off the collection tank purging solenoid valve TPV; conditions 5.1 to 5.5 correspond to the conditions for switching on or off dispensing purge valve DPV/PR; conditions 6.1 to 6.4 correspond to the conditions for switching on or off a water dispensing valve DV; conditions 7.1 and 7.2 correspond to the conditions for switching on or off the empty tank signal for the dispensing tank 32; conditions 8.1 and 8.2 correspond to the conditions for switching on or off the overflow (OR)/full tank signal (FS) of the collection tank 30 or dispensing tank 32; conditions 9.1 to 9.3 correspond to the conditions for switching on or off the ready to dispense indicator (RS); and conditions 10.1 to 10.5 correspond to the triggering of the different purging states.

Using the dispenser pump 22 as an example, the output 'ON' state of the dispenser pump 22 may correspond to the following three input conditions:

Input condition 1: A dispensing push button (BN) being activated or 'ON', empty tank signal (ES) is 'OFF' and purging state equals to 0 which signifies that the condensate filtration unit is at a normal dispensing state and filtered water is sent to the water dispenser 24;

Input condition 2: The collection tank 30 water level corresponds to high is detected (i.e. CH=1) and start-up (which may correspond to the first purging state) purging has been completed (i.e. purging state=1); or Input condition 3: The dispensing tank 30 (also known as "storage tank") water level corresponds to high (SH=1) and filter purging has been completed (i.e. purging state=2).

In some embodiments, the one or more purging states as mentioned earlier can comprise four purging stages incorporating the dispensing state, hereinafter referred to as purging stages 0 to 3. The purging stages 0 to 3 are elaborated as follows:

Purging stage 0: Corresponds to normal dispensing and no purging;

Purging stage 1: Corresponds to the first purging state or 'start-up' purging where the air-conditioner is operated for the first time or first instance. The first time or first instance may also refer to the first time or first instance after any manual reset of the air-conditioner unit 10;

Purging stage 2: Corresponds to the second purging state or 'filter' purging where the filter unit 36 is required to be cleaned and maintained; or where an used filter is replaced with a new filter; and Purging stage 3: Corresponds to a need to replace the filter unit 36 (e.g. after the air-conditioner unit 10 has been operated for more than a predetermined time period in hours or where the flow meter 50 reads a total volume of more than a pre-determined volume, e.g. six-thousand (6000) liters).

Purging is performed primarily for cleaning and maintenance of certain components in the water filtration unit 18. In one operation example, when the air-conditioner unit 10 is turned on, the flow meter 50 operates to read or obtain the total volume of water that has been purged and dispensed. If the volume of the water purged and dispensed is less than a pre-fixed amount, say X cubic centimeters, it will continue to run at purging stage 1 which purge water from the collection tank 30 (i.e. 'start-up' purging). As the amount of water purges or dispenses more than X cubic centimeters, the system switches to purging stage 2 to clean up the plurality of filters 36 and the dispensing tank 32 ('filter purging'). The purging operation stops when the amount of water dispensed is more than Y cubic centimeters. The system will switch into maintenance mode, denoted by purging stage 3 as the system has dispensed more than volume Z cubic centimeters. In purging stage 3, the user will be prompted to change the filter 36. Once changed, the user will be prompted to and press the purging button, which toggle the purging stage back to 1 to repeat the 'start up' purging procedure.

In some embodiments, the flow meter 50 may be reset. A reset of the flow meter 50 may trigger purging stage 1.

In FIG. 5, with reference to the conditions "10.1" to "10.5", a purging state of 0 corresponds to the situation where the flow meter 50 reads a total volume of water dispensed to be above Y cubic centimeters and corresponds to the normal dispensing stage. The purging state 1 corresponds to either: (a) the flow meter 50 reads a total volume of water dispensed to be less than X cubic centimeters (where X is a pre-determined start-up purging volume).

A purging state 2 corresponds to the situation where the purging push button (PBN) is pushed (i.e. state of PBN=1) OR where the flow meter 50 reads a total volume of water dispensed to be above X cubic centimeters AND the flow meter 50 reads a total volume of water dispensed to be less than Y cubic centimeters AND current purging state is equals to 1. Purging state 2 also corresponds to the state where new filter(s) are added and water flowing pass the new filters for the first time or instance is purged.

Finally, a purging state 3 corresponds to the situation where the total volume of water dispensed is more than Z cubic centimeters and the purging state is equals to 0. Purging state 3 is triggered when the life span of filters is reached and the current purging stage is 0. An indicator may be displayed on the air-conditioner unit 10 to highlight purging state 3 so as to prompt a user to replace one or more of the plurality of filters.

In general, the water filtration unit 18 is switchable between a first state where water from the collection tank is purged without filtration, and a second state where water from the dispensing tank 32 is filtered and then pumped to the water dispenser 24.

Purging is necessary in situations where the air-conditioner unit 10 is used for the first time or when impurities have accumulated and some form of maintenance is required. In one purging state, condensed water stored in the collection tank 30 may be directly purged without going through the filters (also known as "a first purging state"). In another purging state, the filtered water stored in the dispensing tank 32 may be purged (also known as "a second purging state"). In other words, the purging can be performed (i) at the collection tank 30 using unfiltered condensate or (ii) at the dispensing tank 32 using filtered condensate.

In the dispensing state, instead of being purged, the filtered water is directed to the water dispenser 24.

Whether or not to activate purging depends on whether the filters and dispensing tank 32 require cleaning and maintenance. One example where purging is essential would be the first usage of the air-conditioner unit 10.

In the context of the present invention, it is important that there is proper maintenance of air-conditioner units to ensure that there is consistency in the quality of the water produced—i.e., the water produced remains fit for consumption. The present invention provides the plurality of purging states (e.g., the first purging state and the second purging state) which correspond to the overall motivation to provide a cost-effective and environmentally friendly solution such that all parts of the air-conditioner unit or condensate filtration unit are effectively cleaned before water is considered fit for consumption.

For example, in some embodiments of the invention, the first purging state is associated with the "first use of the air-conditioner unit", while the second purging state is associated with the "first use of the filter". However, it is clear to any skilled person that the first purging state and the second purging state can also be associated with other circumstances—e.g., if a sensor detects certain impurity in the air-conditioner and/or the filter, the corresponding purging state can be activated to clean the respective components.

During the first use of the air-conditioned or condensate filtration unit, the whole machine, including the collection tank requires cleaning, thus condensate collected from the tray are drained and used to flush the metallic impurities collected within the pipes, conduits during manufacture for a period of time. Condensate are directly purged without going through the filter unit 36 so as not to compromise the life and/or efficiency of the filter unit. In other words, the condensate used to clean the collection tank 30, which could be filthy and contain impurities, does not pass through the plurality of filters 36.

Similarly, when the plurality of filters 36 and/or dispensing tank requires cleaning and maintenance (e.g., during the first use of the filters 36), filtered condensate from the dispensing tank, which could still be filthy and contain impurities because it has been used to clean the filter unit, can be purged instead of consumed.

In combination, the two purging states ensure that the condensate (e.g., water) when stored in the dispenser, is fit for some kind of consumption (e.g., drinking).

Furthermore, the two purging states could also facilitate energy saving and accordingly lower operation costs of the air-conditioner units. For example, the condensate (e.g., water) that is directed to the plurality of filters 36 should be in a cleaner form because the condensate used to clean the collection tank 30 can be directly purged without going through the plurality of filters, thereby increasing the shelf life of the plurality of filters and lowering the operation costs.

Also, this multi-purging state arrangement allows the condensate collected from the tray 16 to be selectively used—i.e., a first purging state wherein condensate stored in the collection tank 30 is directly purged without going through the plurality of filters, and a second purging state wherein filtered condensate from the dispending tank is purged. In comparison to conventional air-conditioners that only rely on clean/filtered water for cleaning the various components, the present invention lowers the operation costs by selectively utilizing unpurified or unfiltered condensate (e.g., water) collected from the tray 16 to clean the collection tank 30.

In some embodiments, the filtered water stored in the dispensing tank 32 will be pumped to the water dispenser 24 after the quality of the filtered water has been checked and measured.

FIG. 7 illustrate embodiments of the condensate filtration unit 18 which incorporate a pump 72 to pump condensate to different pathways as controlled by the electronic controller 34 (not shown) via a plurality of solenoid valves. In the embodiments shown in FIG. 7*a* (embodiments that dispense cold water only), 7*b* (embodiments that dispense hot and cold water) and 7*c*/7*d* (embodiments dispense hot and cold water, and purge both hot water tank and cold water tank), the filter unit 36 comprises a sediment filter 74, a carbon-based filter 76, a membrane filter 78 (ultrafiltration), and a ultra-violet filter 80 arranged in successive order based on condensate flow. The pump 72 is arranged to pump condensate from the temperature regulation unit 12 to the filter unit 36. Solenoid valves 82 and 84 are arranged to be activated when a user wishes to dispense cold water (or ambient temperature water) via outlet 90 and dispense hot water via outlet 92 respectively. Solenoid valve 86 is arranged to direct the filtered condensate to be purged in accordance with the second purging state. Solenoid valve 88 is arranged to direct condensate water back to a condensate collection tank (not shown) which is positioned in the temperature regulation unit 12.

Figure 7A:
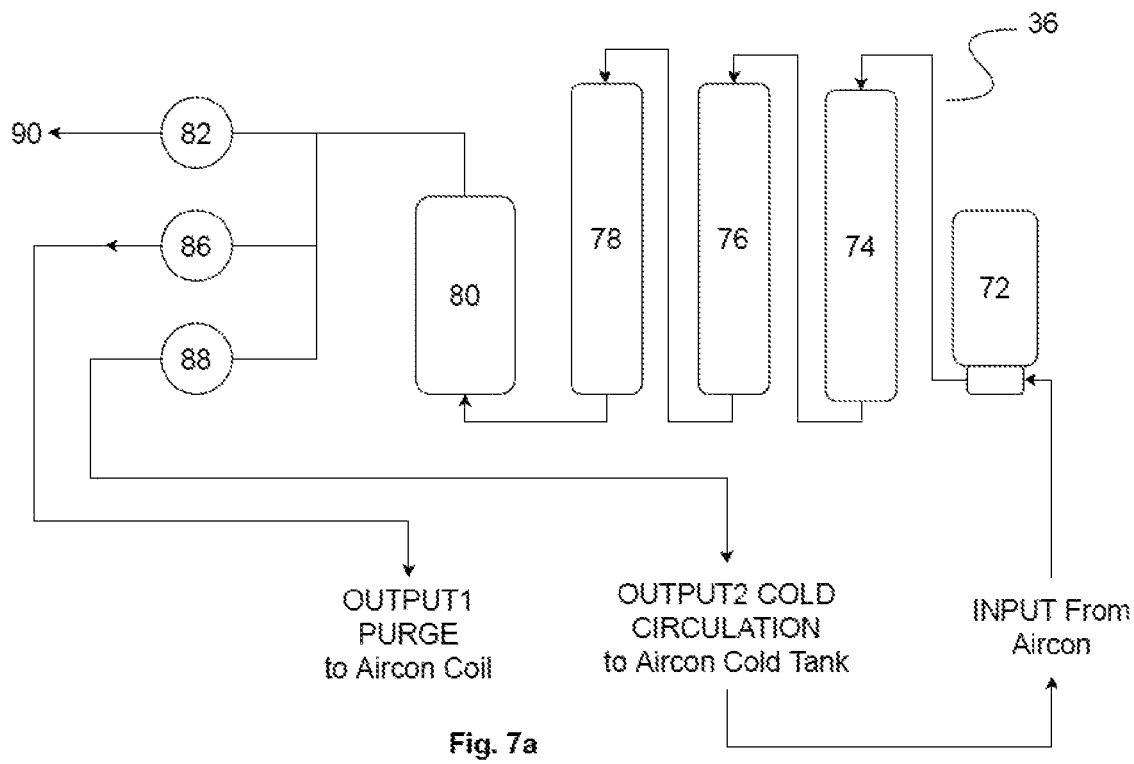
FIGS. 7a to 7d show other arrangements of the water filtration unit comprising a pump and a plurality of filters.

FIG. 7a illustrates a relatively basic setup which cold filtered condensate in the form of cold water may be dispensed. The activation of the outlet 90 to dispense cold water triggers (a.) the pump 72 to pump condensate water through the filters 74, 76, 78 and 80 and (b.) the opening of solenoid valve 82. The cold water is then dispensed though the outlet 90. When operating in the second purging state, the solenoid valve 86 opens and water is purged and recycled to the evaporator or condenser coils of the temperature regulation unit 12. The solenoid valve 88 is utilized to facilitate a circulation state where the filtered condensate is circulated to the temperature regulation unit.

Figure 7B:
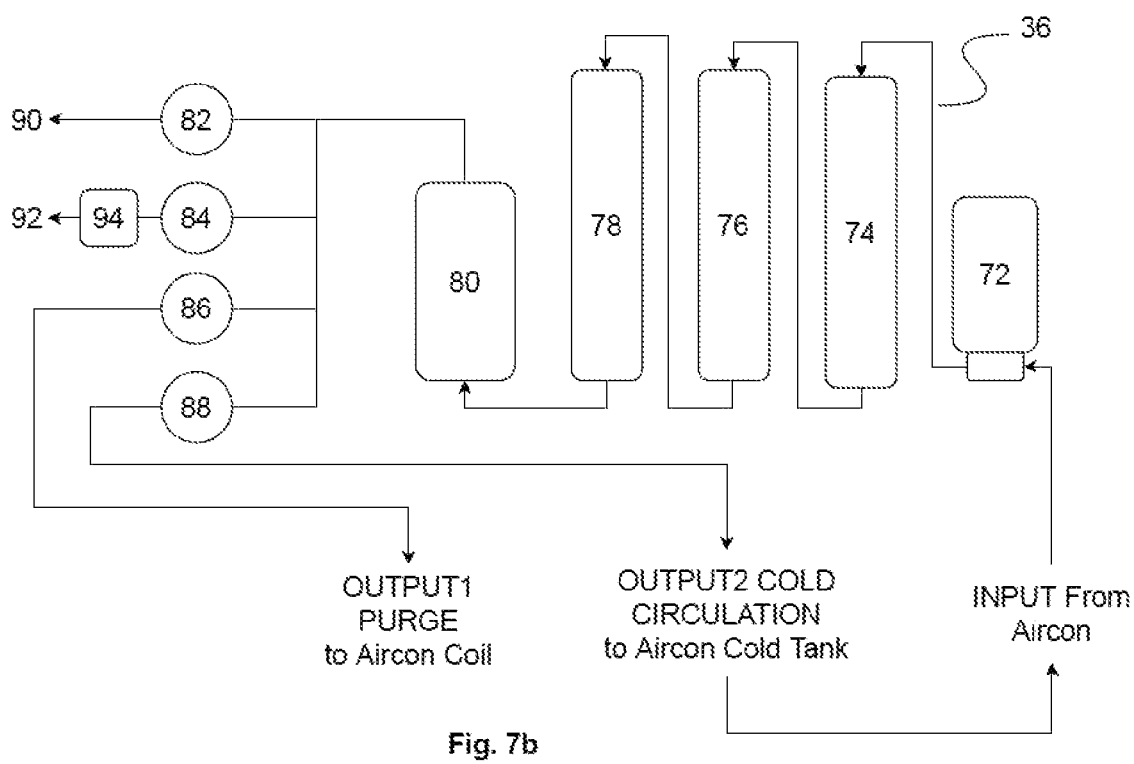
Figure 7C:
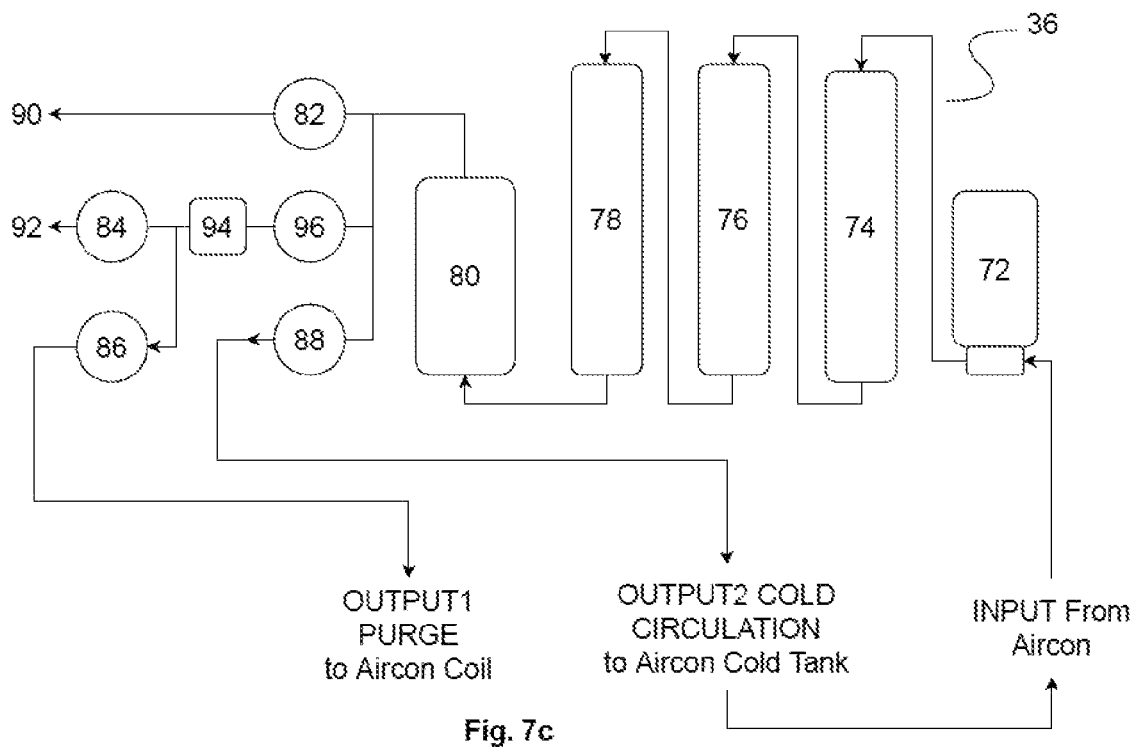
Figure 7D:
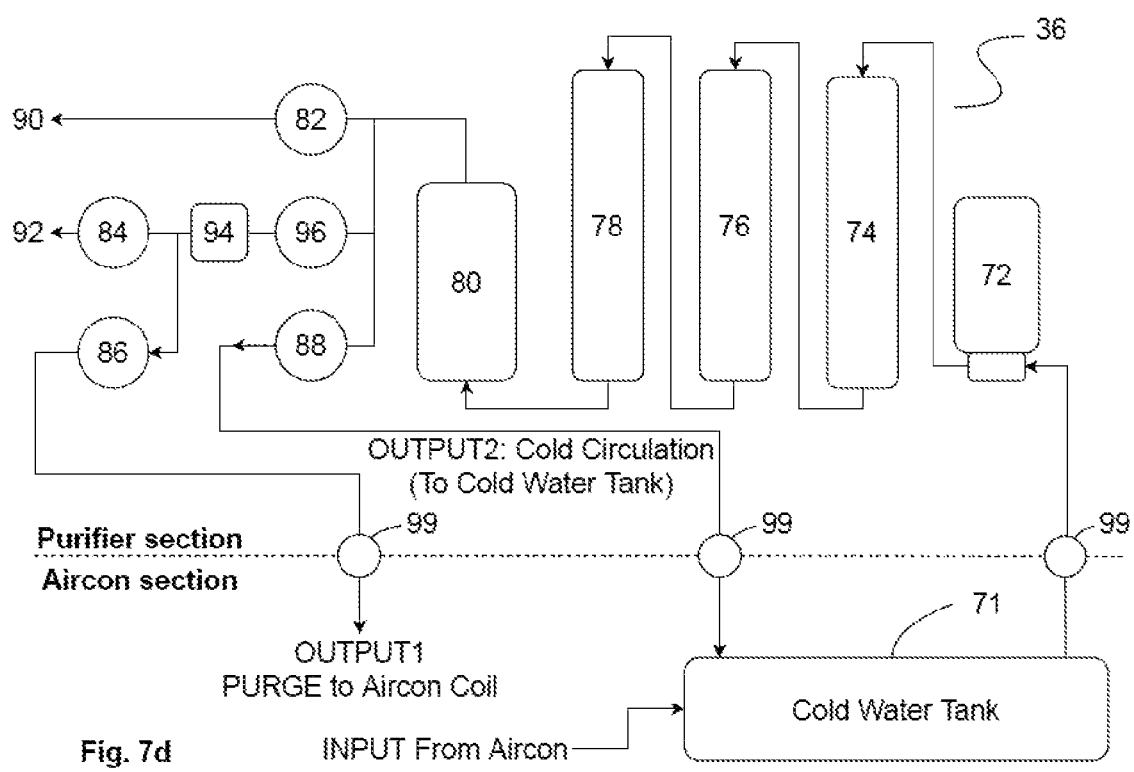

FIGS. 7b, 7c and 7d illustrate a more advanced setup incorporating a heating element 94 for hot water dispensing. The heating element 94 is arranged to heat up the filtered condensate after the condensate pass through the filters 74, 76, 78 and 80. In some embodiments, the heating element 94 has a storage capacity of 600 ml, a heating power 600 W; and is configured to control the temperature of the hot water (i) below 60° C. by turning off its electricity supply once the temperature of the hot water reaches the upper limit, but (ii) above 50° C. by turning on its electricity supply once the temperature of the hot water drops below the lower limit.

In FIG. 7b the hot water element 94 is positioned between the outlet 92 and the solenoid valve 84, whereas in FIG. 7c the hot water element 94 is positioned between the solenoid valve 84 and a non-return valve 96 positioned at the output of the filter unit 36 to prevent hot water from flowing back to the filter unit 36. The activation of the outlet 90 to dispense hot water triggers (a.) the pump 72 to pump condensate water through the filters 74, 76, 78 and 80 and (b.) the opening of solenoid valve 84. The hot water is then dispensed though the outlet 92. FIG. 7d illustrates further details of the embodiments that can dispense and purge both hot and cold water. The purified section ("the condensate filtration unit") and the Aircon section ("the temperature regulation unit") are connected together at various linkages (e.g., output 1, output 2 and aircon section input) by connectors 99. FIG. 7d also further illustrates that the cold circulation involves directing filtered condensate back into a cold water tank 71, which is configured to also receive condensate generated by the temperature regulation unit.

The difference in arrangement between FIGS. 7b and 7c/7d allows hot water to be purged in FIG. 7c.

Although FIG. 7 does not illustrate the by-pass of the filter unit 36 associated with the first purging state, it is to be appreciated that the condensate filtration unit 18 may comprise an purging outlet having one or more solenoid valves (not shown) connected directly from the pump 72 to the pathway to be purged to the evaporator and/or condenser coils, where the solenoid valves may be controlled by the electronic controller 34 to effect the first purging state.

Figure 8:
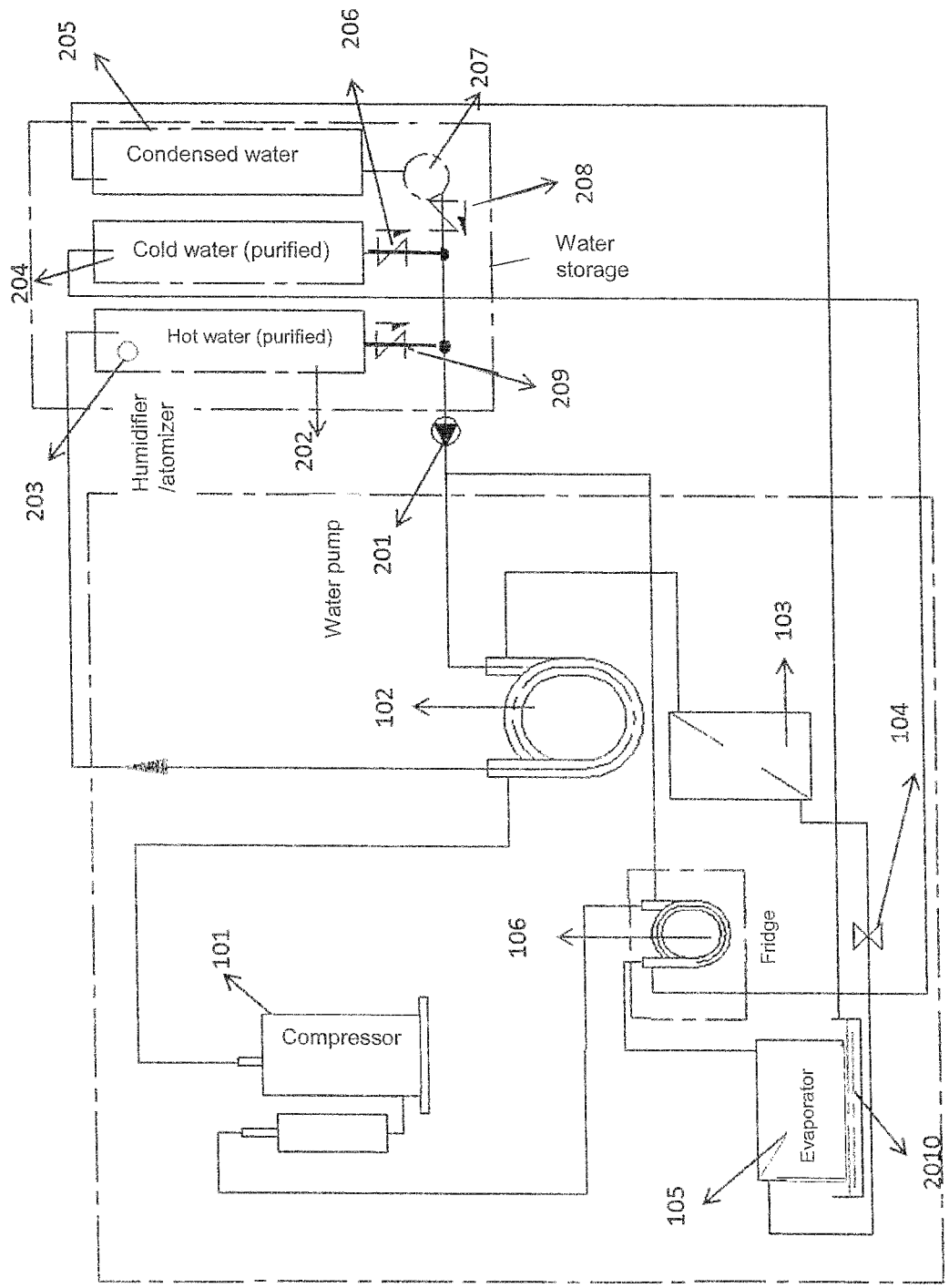
FIG. 8 is a system block diagram of the air-conditioner unit in accordance with various embodiments.

In various embodiments, and with reference to an arrangement shown in FIG. 8, the air-conditioner unit 10 comprises additional components to recover heat generated from the compression of the refrigerant for various usage and purpose. Through the arrangement of heat exchangers such as evaporator coils and condenser coils, heat gain from a component such as evaporator, which leads to reduction in temperature around the component, could be used to cool other components (e.g., cooling water). Similarly, heat dissipation from a component such condenser, which leads to increase in temperature around the component, could be used to heat other components (e.g., heating water). The arrangement shown in FIG. 8 may be used in implemented in the temperature regulation unit 12 and may be used conjunction with the condensate filtration unit 18. In alternative embodiments, the arrangement shown in FIG. 8 may be implemented in other air-conditioner units (not shown).

The components are connected as shown in FIG. 8 and comprise an electronic controller (not shown), hereinafter referred to as a second electronic controller for clarity purposes, operable to control an electronic expansion valve-throttling device 104 to regulate the quantity of refrigerant flowing through the electronic expansion valve-throttling device 104 via adjustments of pressure and temperature. The second electronic controller may be integrated with the electronic controller 34 or may be a separate and independent electronic controller. The second electronic controller is in data communication with at least one temperature sensor for sensing the environment (typically indoor) that the air-conditioner unit 10 is placed in, for example to sense the temperature of the condensed water, condenser coils, exhaust, and/or return gas temperature etc. In some embodiments, the input of the electronic controller 34 may also be utilized. In some embodiments, multiple temperature sensors may be used. The second electronic controller may be pre-programmed to operate in at least four different modes depending on different priority(ies), including:

a. Full feature mode (with hot water and cold water dispenser, cooling and refrigeration);
b. Temperature regulation mode (i.e., one type of priority mode where cooling of environment is the main priority), also known as "cooling priority mode";
c. Water dispensing mode (i.e., one type of priority mode where dispensing drinkable water is the main priority), also known as "water dispensing priority mode"; and
d. Refrigeration mode (i.e., one type of priority mode where the provision of cold water is the main priority), also known as "refrigeration priority mode".

The arrangement of FIG. 8 seeks to provide a multi-functional air-conditioner system and comprises a compressor 101, a first heat exchanger 102, an evaporator 105, a condenser 103, a second heat exchanger 106, an electronic expansion valve-throttling device 104, condensed water purification system 207, and a humidifier/atomizer 203 suitable to humidify/atomize excess water. The condensed water purification system 207 may include the condensate filtration unit 18 as described in other embodiments. In some embodiments, the first heat exchanger 102 and the second heat exchanger 106 comprise tubes/conduits/pipes. In some embodiments, the second heat exchanger 106 is integrated into a fridge 109 to provide cooling.

In various embodiments, the first heat exchanger 102 is positioned at the inlet side of the condenser 103 for transferring heat from the compressed refrigerant to a liquid (e.g., water) stream. The liquid stream for heating may be pumped from a condensed water tank 205. The liquid stream that is heated may be directed back to the hot water tank 203. In various embodiments, the compressed refrigerant may be in superheated state. In various embodiments, the compressed refrigerant at the outlet of the first heat exchanger 102 may not be fully condensed (i.e. not saturated liquid). As such, condensation of the non-saturated liquid at the outlet of the first heat exchanger 102 may be further performed.

In various embodiments, compressed refrigerant at the outlet of the first heat exchanger 102 may be passed through the condenser 103, wherein the condenser 103 can also function to transfer heat from the compressed refrigerant to the environment or ambient air (i.e., dumping heat and entropy to the ambient air) as in a typical operation of a refrigerant cycle. As heat is removed or dumped to the ambient air, the compressed refrigerant may either condense from gaseous state to be in a substantially saturated liquid state or from non-saturated liquid state to substantially saturated liquid state depending on the amount of heat transferred to the water stream at the first heat exchanger 102. In this case, the environment or ambient air may be the air that is outside of the room. In various embodiments, the heat that is removed from the compressed refrigerant may be referred to as the latent heat of vaporization.

At least one technical advantage for positioning the first heat exchanger 102 at the inlet side of the condenser 103 may be to utilize the full heating capacity of the compressed refrigerant for heating the liquid (e.g., water) stream, and the condenser 103 may be used at the outlet of the first heat exchanger 102 to complete the condensation of the refrigerant if it is in non-saturated liquid state.

There is another technical advantage for passing liquid (e.g., water) stream through the first heat exchanger 102 (and the condenser 103 in some embodiments) to take away the heat dissipating from the refrigerant condensation. Conventional portable air-conditioner units, usually having the condensers and the evaporators integrated into one apparatus, in general require a hose/pipe/conduit to transfer heat out of the space (e.g., an enclosed room) to be cooled. The requirement of the hose/pipe/conduit may limit the portability of the air-conditioner units: for example, such a conventional air-conditioner unit often needs to be placed near a window or a wall (with a hole) that allows the hose/pipe/conduit to be extended outside the space (e.g., enclosed room). As the present invention utilizes liquid (e.g., water) to cool the first heat exchanger (and/or the condenser), there is no need to utilize the hose/pipe/conduit to direct the heat generated in the air-condition unit out. The portability of the air-condition unit is therefore improved since the movement and placement of the air-condition unit is no longer constrained by the hose/pipe/conduit. The present invention is therefore also known as "hoseless" design.

In various embodiments, the condensed refrigerant at the outlet of the condenser 103 may be passed through the evaporator 105, wherein the evaporator 105 may function to absorb heat from the air to be cooled, for example the air inside the room. In various embodiment, the liquid state refrigerant, when flowing in the evaporator 105, may absorb heat form the air to be cooled and evaporate in the evaporator 105 into gaseous state. The heat that is absorbed may be the latent heat of vaporization of the refrigerant. In various embodiments, the air to be cooled may contain water vapor or moisture (i.e. the air has a non-zero humidity) such that the said water vapor may condense as the air becomes cooled. In various embodiments, the condensed water vapor or condensate 2010 may be collected in a tray and directed or pumped to a condensate tank 205 for recycling and further uses. In various embodiments, the condensate (e.g., water) may be purified to drinkable standards or fit for consumption via the condensate filtration unit 18 in the condensate purification system 207. The purified water may then be pumped or channeled into the first heat exchanger 102 for heating (as described above); or the second heat exchanger 106 or the refrigerator 109 for cooling (as described below).

In various embodiments, the refrigerant at the outlet of the evaporator 105 may have excess cooling capacity. A non-limiting example in which the refrigerant may have excess cooling capacity is when the refrigerant is not completely evaporated to gaseous state (i.e. the refrigerant vapor quality factor is not 100% or is not a saturated vapor). In this case, a refrigerator 109, housing a second heat exchanger 106, may be located at the outlet of the evaporator 105 for cooling liquid (e.g., water). In various embodiments, the second heat exchanger 106 is operable to transfer heat from the liquid stream to the refrigerant such that the liquid stream is cooled in the process. In various embodiments, the liquid stream for cooling may be pumped from a condensate tank 205. The cooled liquid stream may be directed back to and stored in the cold liquid tank 204 for other uses. Therefore, at least one technical advantage for positioning the second heat exchanger 106 at the outlet side of the evaporator 105 may be to utilize the excess cooling capacity of the non-saturated gaseous refrigerant and also to complete the evaporation of the refrigerant to a substantially or near or fully saturated gaseous state.

Thereafter, the refrigerant at the outlet of the second heat exchanger 106 may be directed or channeled back to the inlet of the compressor 101 to be compressed for the next cycle. In the foregoing, the refrigerant at the inlet of the compressor 101 may be in substantially a saturated vapor state.

Non-limiting examples of heat exchangers that may be used include Shell and tube heat exchanger, Plate heat exchanger, Plate and shell heat exchanger, Adiabatic wheel heat exchanger, Plate fin heat exchanger, Pillow plate heat exchanger, Fluid heat exchangers, Waste heat recovery units, Dynamic scraped surface heat exchanger, Phase-change heat exchangers, Direct contact heat exchangers or Microchannel heat exchangers. Non-limiting examples of the flow arrangements in the heat exchangers may be counter-flow or parallel flow.

In the embodiment of FIG. 8, an air-conditioner compressor 101, which has an exhaust port, is connected to a first heat exchanger 102 in a manner such that an outlet (i.e., the exhaust port) of the compressor 101 is connected to the inlet of the first heat exchanger 102. The outlet of the first heat exchanger 102 is in turn connected to the inlet of the condenser 103. The outlet of condenser 103 is fed to the inlet of the electronic expansion valve-throttling device or expander 104, which is controlled by the second electronic controller to regulate the pressure and temperature of the refrigerant, the regulated refrigerant is in turn fed to the inlet of the evaporator 105. The outlet of the evaporator 105 may be fed to a second heat exchanger 106 for cooling of the same. In some embodiments, the second heat exchanger 106 is housed in a refrigerator 109. The second heat exchanger 106 or the refrigerator 109 may be compact so as to form part of the temperature regulation unit 12.

After the condensate 2010 is collected via a tray located beneath the evaporator 105, the condensate will then be directed to a condensate container 205, and subsequently purified to drinkable standards or fit for consumption via the condensate purification system 207. The purified or filtered liquid (e.g., water) can then be directed to pass through the first heat exchanger 102 to be heated up; and the liquid can also be directed to pass through the second heat exchanger 106 to be cooled down. The liquid dispenser 24 (e.g., water dispenser) may comprise different liquid tanks for storage of liquid at different temperatures. When each of the respective liquid tanks of the liquid dispenser 24 are full or when the hot liquid tank is full, the humidifier 203 that is installed in the hot liquid tank will be activated in order to humidify/atomize the excess hot liquid (e.g., hot water). This will help to maintain the humidity in the external environment and will bring greater comfort such that the cooling process does not cause the surrounding air to be too dry.

The at least four modes as highlighted will be described and elaborated as follows:

The Full Feature Mode

In the full feature mode, the compressor 101 compresses the air-conditioner refrigerant into a gaseous state at a high temperature and a high pressure, and passes the refrigerant through the condenser tubes/pipes 102. Upon receipt of the purified drinking water, the purified water is passed through the first heat exchanger 102 that takes away a large portion of heat energy, resulting in cooling of the refrigerant and heating of the purified water. The purified water then becomes drinkable hot water. When the hot water tank 202 is full, and there is a need to operate the cooling system to achieve cooling, the excess hot water will be humidified so as to ensure that there is sufficient water that is taking away the heat. The refrigerant then passes through the condenser 103 (which turns the high temperature high pressure gaseous refrigerant into liquid state at medium temperatures and medium pressure).

Using the second electronic controller, the electronic expansion valve-throttling device 104 receives electronic signals for dynamic adjustments, and processes the refrigerant at medium temperature and medium pressure to become a liquid state at low temperatures and low pressure. The low temperature and low pressure refrigerant then enters the evaporator 105. The evaporator 105 releases the cooling capacity of the refrigerant and the refrigerant becomes a liquid state or a mixed liquid-gaseous state at low temperatures and low pressure, when this then passes through the refrigerator or water-cooling apparatus 106, the excess cooling capacity will be absorbed by the water and the refrigerator (to become cold drinking water and/or to create a low temperature refrigeration environment). The gaseous refrigerant (at low temperature and low pressure) then returns to the compressor and the work cycle can be repeated.

The Air-Conditioning Mode

In the air-conditioning (temperature regulation) mode (where cooling of temperature is of priority): the compressor 101 compresses the refrigerant into a gaseous state at high temperatures and high pressure, and passes this through the first heat exchanger 102 (the purified drinking water takes away a large amount of heat and becomes drinkable hot water, when the hot water tank 202 is full, and due to the need to operate the temperature regulation function, the hot water will be humidified so as to ensure that there is sufficient water that is taking away the heat energy), the refrigerant then passes through the condenser 103 (which turns the high temperature high pressure refrigerant into liquid state at medium temperatures and medium pressure).

Based on the electronic control input received from the second electronic controller (the electronic control senses the temperature indoors, and sets the temperature, the temperature of the evaporator coil, condensing temperature, condenser coil temperature, exhaust gas and return gas temperatures etc.), the electronic expansion valve-throttling device 104 issues commands for dynamic adjustments, and processes the refrigerant at medium temperature and medium pressure to become a liquid state at low temperatures and low pressure, this then enters the evaporator 105 (the evaporator 105 releases the cooling capacity of the refrigerant, and in addition a wind generator will be activated and set at low speed, although the user can adjust the wind speed if need be). The refrigerant next becomes a liquid state or a mixed liquid-gaseous state at low temperatures and low pressure, when this then passes through the second heat exchanger 106, the excess cooling capacity will be absorbed by the water and the refrigerator (i.e., to become cold drinking water and/or to create a low temperature refrigeration environment). The gaseous refrigerant then returns to the compressor and the work cycle can be repeated. Due to the need for cooling as priority, when there is insufficient condensate to take away the heat, a suitable amount of cold water should be added timely into the water tanks.

Water Dispenser Mode

In the water dispenser mode, where the provision of drinkable water is of priority, the work flow is similar to the air-conditioner mode except that the air-conditioner unit 10 operates to maximize the filling up of the water dispenser 24 and tanks (i.e., 202, 204, 205) and the wind generator may be turned on/off to maximize the formation of condensate.

Where the formation of cold water is the main priority, the workflow is similar to the full feature mode except that the wind circulation will be set to a 'breeze mode' which is suitable for both cooling and formation of the condensate.

In the described embodiment in FIG. 8, check valves 206, 208 and 209 may be provided and positioned at the outlet of water tanks 202, 204 and 205 to prevent backflow of water. In some embodiments, the check valves 206, 208 and 209 are electronic valves, subject to control of electronic controller.

In various embodiments, non-limiting examples of refrigerant or working fluid that may be used include R-22 (also known as chlorodifluoromethane), R-410A, R-407C, R-134a, ammonia, sulfur dioxide and non-halogenated hydrocarbons such as propane. The choice of refrigerant may be optimized based on at least the temperature required for hot and cold water as well as the ambient and room temperatures since every refrigerant may have different operating temperatures and pressures depending on their phase transition (liquid to gas and vice versa) characteristics.

Figure 9:
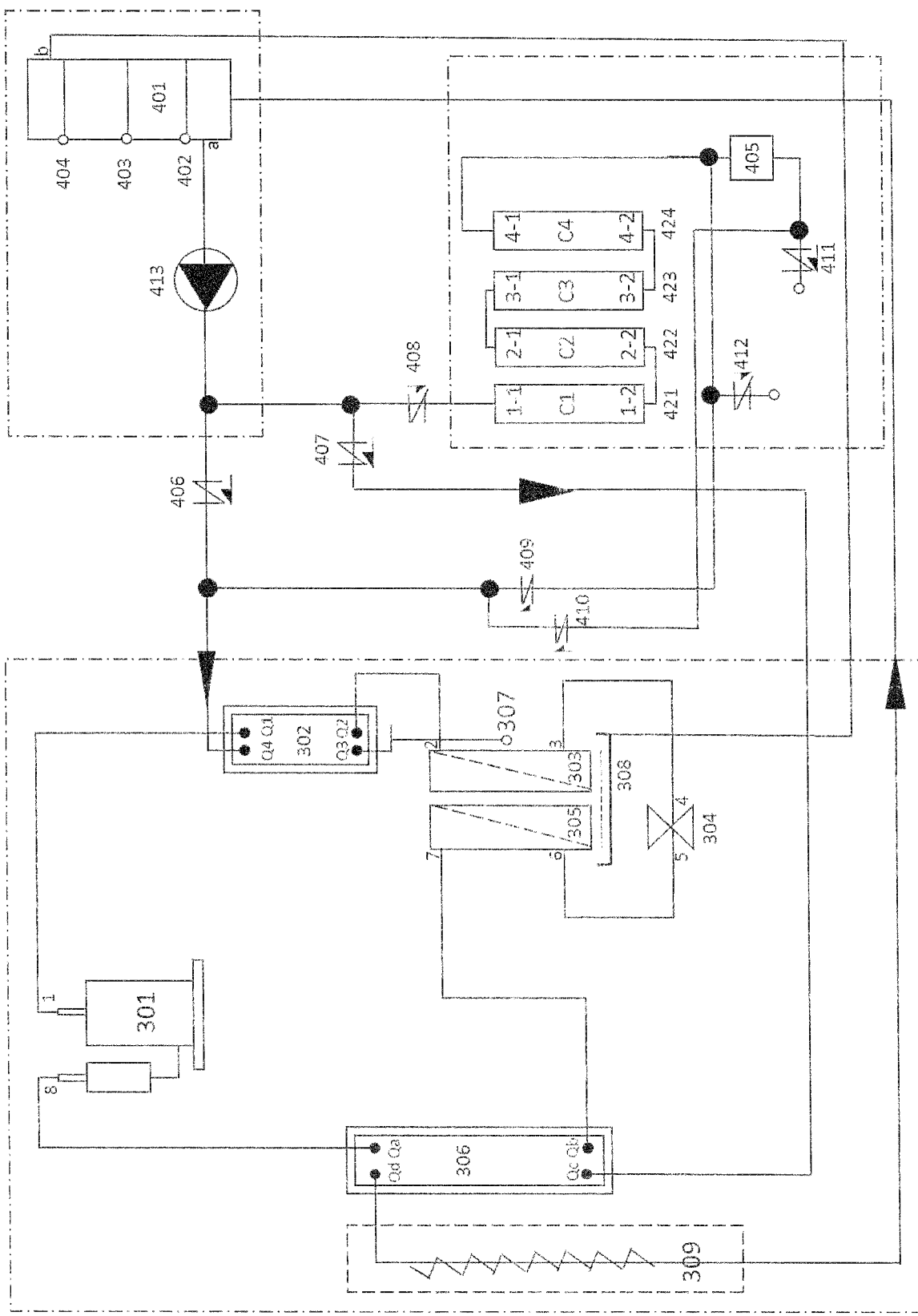
FIG. 9 is a system block diagram of the air-conditioner unit in accordance with various embodiments.

In various embodiments, and with reference to an arrangement shown in FIG. 9, the present invention comprises three main sub-units:

(i) a temperature regulation unit;
(ii) a container unit;
(iii) a filtration unit.

The temperature regulation unit comprises a compressor 301, a first heat exchanger 302, an evaporator 305, a condenser 303, a second heat exchanger 306, an electronic expansion valve-throttling 304 controlled by an electronic controller, a humidifier/atomizer 307, a condensate collection tray 308, and a fridge 309.

The container unit comprises a condensate container 401 and a liquid pump 413. In some embodiments, the condensate is water, and the container unit is also known as "water source unit", providing water source to other components of the air-conditioner system.

The filtration unit comprises a plurality of filters (e.g., 421, 422, 423 and 424) and a heater 405. The present invention may also comprise a plurality of valves (e.g., 406, 407, 408, 409, 410, 411 and 412) operable to regulate liquid flow. In some embodiments, the valves are electrical valves.

The compressor 301 comprises an exhaust port.1 configured to be connected to a port.Q1 of the first heat exchanger 302. A port.Q2 of the first heat exchanger 302 is connected to an inlet.2 of the condenser 303. An outlet.3 of the condenser 303 is connected to an inlet 4 of the electronic expansion valve-throttling 304. An outlet 5 of the electronic expansion valve-throttling 304 is connected to an inlet.6 of the evaporator 305. An outlet 7 of the evaporator 305 is connected to a port.Qb of the second heat exchanger 306. A port.Qa of the second heat exchanger is connected to an inlet 8 of the compressor 301.

Condensates from the evaporator 305 are collected in a tray 308, and are directed (e.g., by a liquid pump) to flow into the condensate container 401. The condensate container is configured to have three predetermined condensate levels: a predetermined high level (404), a predetermined medium level (403) and a predetermined low level (402). The outlet.a of the condensate container 401 is connected to a liquid pump 413.

a) The liquid pump 413 may be connected to an electrical valve 406, which is operable to direct liquid into a port.Q4 of the first heat exchanger 302. Liquid from the port.Q4 is directed to flow into the humidifier/atomizer 307 via the port.Q3 of the first heat exchanger 302.

b) The liquid pump 413 may also be connected to another electrical valve 407. The outlet of the electrical valve 407 is connected to a port.Qc of the second heat exchanger 306. A port.Qd of the second heat exchanger 306 is connected to the inlet.b of the condensate container 401.

c) The liquid pump 413 may also be connected to another electrical valve 408 operable to direct the liquid to a plurality of filters (e.g., 421, 422, 423 and 424). In some embodiments, the filter 421 is a sediment filter; the filter 422 is a carbon filter; the filter 423 is an ultrafiltration filter; and the filter 424 is an ultraviolet filter. The outlet of the electrical valve 408 is connected to the inlet 1-1 of the filter 421. The outlet 1-2 of the filter 421 is connected to the inlet 2-2 of the filter 422. The outlet 2-1 of the filter 422 is connected to the inlet 3-1 of the filter 423. The outlet 3-2 of the filter 423 is connected to the inlet 4-2 of the filter 424.

The outlet 4-1 of the filter 424 can be connected to the heater 405. The outlet of the heater 405 is connected to the electrical valve 411 and the electrical valve 410. The electrical valve 410 directs the liquid flow to a port Q4 of the first heat exchanger 302. Liquid from the port.Q4 may then be directed out of the first heat exchanger 302 via the port.Q3 into the humidifier/atomizer 307.

The outlet 4-1 of the filter 424 may be connected to an electrical valve 412 and an electrical valve 409. The outlet of the electrical valve 409 may be connected to the port.Q4 of the first heat exchanger 302. Liquid entering into the first heat exchanger 302 via the port.Q4 may be then directed out of the first heat exchanger 302 via the port.Q3, and subsequently into the humidifier/atomizer 307.

In the various embodiments as described in FIG. 8, the present invention is able to operate in multiple operation models for various purposes, such as:
(a) cooling mode;
(b) dehumidifying mode (also known as "water generation mode");
(c) drinking water mode;
(d) air cooler fan mode; and
(e) fridge mode.

In some embodiments of the invention, which mode to be operated is dependent on the condensate level inside the condensate container (e.g., the quantity of water inside the water source/water container).

Cooling Mode

During the operation of the cooling mode, once the condensate (e.g., water) level inside the condensate container 401 is detected to have dropped below the medium level (403), the air-conditioner system will be switched to the dehumidifying mode. In some embodiments, the cooling mode can operate only when the condensate (e.g., water) level inside the condensate container is detected to be reach or above the medium level (403). In some embodiments, during the operation of the cooling mode, if the condensate level drops below the low level (402), the operation mode will be automatically switched from the cooling mode to the dehumidifying mode.

The cooling mode operates as follow: both the electrical valve 406 and the liquid pump 413 are turned on, directing the condensate (e.g., water) into the first heat exchanger 302 via the port.Q4. The compressor 301 is activated to compress the liquid state refrigerant into high temperature high pressure gaseous state. The gaseous state refrigerant then flows into the first heat exchanger 302 via the port Q1.

Inside the first heat exchanger 302, the condensate carries heat away from the gaseous state refrigerant, and flows into the humidifier/atomizer 307 via the port.Q3.

The condensate, after being atomized into fine droplets, flows through the condenser 303 and the evaporator 305. A portion of the atomized condensate will condense again, and drop into the tray 308. The rest of the atomized condensate will be released into the ambient air.

The refrigerant flows out of the first heat exchanger 302 via the port.Q2, and into the condenser 303 via the inlet.2. The refrigerant then flows out of the condenser 303 via the outlet.3 into the inlet.4 of the electronic expansion valve-throttling 304 that is operable to convert the refrigerant into low temperature low pressure liquid state. The low temperature low pressure liquid state refrigerant then flows out of the electronic expansion valve-throttling 304 via the outlet.5 and into the evaporator 305 via the inlet.6. Inside the evaporator 305, the low temperature low pressure liquid state refrigerant then starts to evaporate into gaseous state, accordingly, extracting heat away from the air around the evaporator 305. The gaseous state refrigerant then flows out of the evaporator 305 via the outlet.7 and into the second heat exchanger 306 via the port Qb. The gaseous state refrigerant further flows out of the second heat exchanger 306 via the port Qa into the inlet.8 of the compressor 301 to repeat the process described above.

During the operation of the cooling mode, the electronic expansion-throttling valve 304 can be programmed to regulate the pressure and/or temperature of the refrigerant in a dynamic manner according to electronic commands from electronic controllers that monitor, for example, room temperature, predetermined temperature, temperature of the evaporate coils, temperature of the condenser coils, temperature of exhaust gas and/or return gas.

During the first use of the air-conditioner, in order to achieve optimal cooling effect, cool water can be added into the condensate container 401 according to its size. This arrangement ensures that the condensate level inside the condensate container 401 is maintained above the medium level (403), providing sufficient condensate (e.g., water) to cool the refrigerant inside the first heat exchanger 302.

Dehumidifying Mode

In some embodiments, the dehumidifying mode can be automatically activated once the condensate level inside the condensate container 401 is detected to have dropped below the low level (402), and the dehumidifying mode will only stop when condensate level inside the condensate container 401 reaches the medium level (403). This arrangement timely activates the dehumidifying mode to generate condensate (e.g., water), ensuring that there is sufficient water inside the system to cool the refrigerant inside the first heat exchanger 302.

The dehumidifying model operates as follow: the compressor 301 is activated to compress the liquid state refrigerant into high temperature high pressure gaseous state. The gaseous state refrigerant then flows (i) into the first heat exchanger 302 via the port.Q1, (ii) out of the first heat exchanger 302 via the port.Q2, (iii) into the condenser 303 via the inlet.2, (iv) out of the condenser 303 via the outlet.3, (v) into the electronic expansion valve 304 via the inlet.4, and (vi) out of the electronic expansion valve 304 via the outlet.5. The refrigerant, after flowing through the electronic expansion valve 304, is transformed into low temperature low pressure liquid state, which flows into the evaporator 305 via the inlet.6. The refrigerant evaporates inside the evaporator 305, extracting heat from the ambient air and causing water molecules inside the air to condense into water condensate. The evaporated refrigerant then flows (i) out of the evaporator 305 via the outlet.7, (ii) into the second heat exchanger 306 via the port.Qb, (iii) out of the second heat exchanger 306 via the port.Qa, and finally (iv) into the compressor 301 via the inlet.8.

During the operation of the dehumidifying mode, the electronic expansion-throttling valve 304 can be programmed to regulate the pressure and/or temperature of the refrigerant in a dynamic manner according to electronic commands from electronic controllers that monitor, for example, room temperature, predetermined temperature, temperature of the evaporate coils, temperature of the condenser coils, temperature of exhaust gas and/or return gas.

During the first use of the air-conditioner, when there is no liquid inside the condensate container 401, the dehumidifying mode can be operated first to extract water molecules from the ambient air to increase the liquid level inside the condensate container 401.

Drinking Water Mode

In some embodiments, the drinking water mode is similar to the dehumidifying mode, but with additional components of the system (e.g., the filters) activated.

In addition to the generation of water via the humidifying mode, the water condensate container 401 directs water into the liquid pump 413 via the outlet.a. The liquid pump 413 then pumps the water condensate into a plurality of filters (e.g., 421, 422, 423 and 424) via an electrical valve 408. The water condensate then passes through the four filters one by one, and become purified and suitable for drinking. In some embodiments, once the purified water flows out of the filter 424, the water can be further heated up (e.g., to around 50° C.~60° C.). When the user wishes to have hot water, the electronic valve 411 can be activated to deliver the hot drinkable water to the user. When hot drinkable water is not required, the electronic valve 412 can be activated to deliver the purified water flowing out of the filter 424 to the user.

Air Cooler Fan Mode

In some embodiments, the air cooler fan mode can only be activated when the condensate level inside the condensate container is above the high level (404).

During the operation of the air cooler fan mode, the compressor 301 is not activated. Once the condensate level drops below the low level (402), the air cooler fan mode stops, and the dehumidifying mode is automatically activated. The condensate container 401 then directs liquid condensate into the liquid pump 413 via the outlet.a. The liquid condensate then flows out of the liquid pump 413 into the electrical valve 406, which is connected to the first heat exchanger 302. The liquid condensate is pumped into the first heat exchanger 302 via the port.Q4, and flows into the humidifier/atomizer 307 via the port.Q3. The humidifier/atomizer 307 then atomizes the liquid condensate into fine droplets, which function to cool down surrounding environment.

Fridge Mode

In some embodiments, the fridge mode operates only when the condensate level inside the condensate container 401 is above the low level (402). Also, once the predetermined temperature (e.g., 5° C.~15° C.) is reached, the fridge mode will automatically stop.

The fridge mode operates as follow: both the electrical valve 406 and the liquid pump 413 are turned on, directing the condensate (e.g., water) into the first heat exchanger 302 via the port.Q4. The compressor 301 is activated to compress the liquid state refrigerant into high temperature high pressure gaseous state. The gaseous state refrigerant then flows into the first heat exchanger 302 via the port Q1.

Inside the first heat exchanger 302, the condensate (e.g., water) carries heat away from the gaseous state refrigerant, and flows into the humidifier/atomizer 307 via the port.Q3. The condensate, after being atomized by the humidifier/atomizer 307 into fine droplets, flows through the condenser 303 and the evaporator 305. A portion of the atomized condensate will condense again, and drop into the tray 308. The rest of the atomized condensate will be released into the ambient air.

The cooled refrigerant flows out of the first heat exchanger 302 via the port.Q2, and into the condenser 303 via the inlet.2. The refrigerant then flows out of the condenser via the outlet.3 into the inlet.4 of the electronic expansion valve-throttling 304 that is operable to convert the refrigerant into low temperature low pressure liquid state. The low temperature low pressure liquid state refrigerant then flows out of the electronic expansion valve-throttling 304 via the outlet.5 and into the evaporator 305 via the inlet.6. Inside the evaporator 305, the low temperature low pressure liquid state refrigerant then starts to evaporate into gaseous state, accordingly, extracting heat away from the air around the evaporator 305. The gaseous state refrigerant then flows out of the evaporator 305 via the outlet.7 and into the second heat exchanger 306 via the port.Qb. The gaseous state refrigerant further flows out of the second heat exchanger 306 via the port.Qa into the inlet.8 of the compressor 301 to repeat the process described above.

During the operation of the fridge mode, the electrical valve 407 is activated to direct the condensate from the condensate container 401 into the second heat exchanger 306 via the port.Qc to get chilled. The chilled condensate then flows out of the second heat exchanger 306 via the port.Qd, and into the fridge 309. The condensate, after passing through the fridge 309 to extract heat and provide cooling effect, flows back into the condensate container 401 via the inlet.b.

During the operation of the fridge mode, the electronic expansion-throttling valve 304 can be programmed to regulate the pressure and/or temperature of the refrigerant in a dynamic manner according to electronic commands from electronic controllers that monitor, for example, room temperature, predetermined temperature, temperature of the evaporate coils, temperature of the condenser coils, temperature of exhaust gas and/or return gas.

Having the air-conditioner system arranged to operate in different operation modes depending on the quantity of water inside the water source is technologically advantageous. For example, the automatic activation of the dehumidifying mode ensures that there is always sufficient water inside the air-conditioner system to support its various functions and ensure its continuous operation. Such an arrangement therefore maximizes the use of water condensate from the ambient air, and minimizes the need for any other external water input—in other words, the air-conditioner system can be installed at locations where there is no convenient external water source (e.g., water hose). Furthermore, by intelligently adjusting the operation mode according to the water quantity inside the water source/water container, the air-conditioner system won't operate a mode inappropriate for the corresponding environment, accordingly preventing malfunctioning of the air-conditioner system (e.g., as air cooler fan mode consumes a lot of water, it should not be activated unless there is abundant water inside the water source). This arrangement of the present invention can be particularly useful in places where the humidity level in the ambient air is low (e.g., middle east countries) and/or the access to water source is limited.

The invention seeks to provide a multi-purpose system that can serve as a portable air conditioner, a hot (cold) drinking water dispenser, an air cooler fan, a dehumidifier and a humidifier.

Through the utilization of electronic controlling mechanisms to adjust the electronic expansion valve-throttling device 104 and the switching between different operation modes such as purging and dispensation, such a system also increases the efficiency of the air conditioner and the water dispenser, decreases the use of electricity, decreases the amount of heat that is released into the environment. This is in part due to the utilization of water condensate by purifying the condensate to drinkable standards, and to heat up or cool down purified water, such that any excess cold energy can be utilized in a small refrigerator (109, 309) or a second heat exchanger (106, 306), and can be used to control the refrigerator temperatures to be between 5 degrees to 15 degrees Celsius (with stable performance).

In addition, the purified condensate may be heated to a suitable temperature so as to provide drinking water. The system will also reduce heat released into the environment, reduce condensing pressure, and reduce the electricity required by the equipment. The quantity of the refrigerant can be controlled automatically through the electronic expansion valves according to the temperatures in the cooling system. This will help to save electricity, increase efficiency and allow the system to perform stably and reliably.

In some embodiments, the electronic controller 34 may be implemented on one printed circuit board (PCB) for compactness. Alternatively, the electronic controller 34 may be implemented on multiple PCBs. In the implementation of logic for control, the different functions associated with heating, cooling or refrigeration, filtration of water, may be implemented with different priority associated with it. Further, control of such functions may be optimized. Non-exhaustive factors that may affect the prioritization and optimization include: temperature of the environment, temperature of the condenser, temperature of the evaporator coils, water temperature at various locations, flow rate of condensed water etc.

In some embodiments, when the air-conditioner or condensate filtration unit is first used, so as to maximize the cooling ability, and to wash the drinkable water tubes most efficiently, a suitable amount of cold water can be manually added according to the size of the water tanks. Furthermore, to ensure that the water is safe for drinking, the user can run an extra cycle of the washing (purging) function in the water dispenser system.

In some embodiments, the air-conditioner and water filtration system may be separated.

While the embodiments have been described using water as the condensate, it is to be appreciated that other condensate obtainable from an air-conditioner could be purified and stored. In other words, the various embodiments and aspects of the invention can be used to obtain and purify condensate in general—the condensate is not limited to just water.

Figure 10:
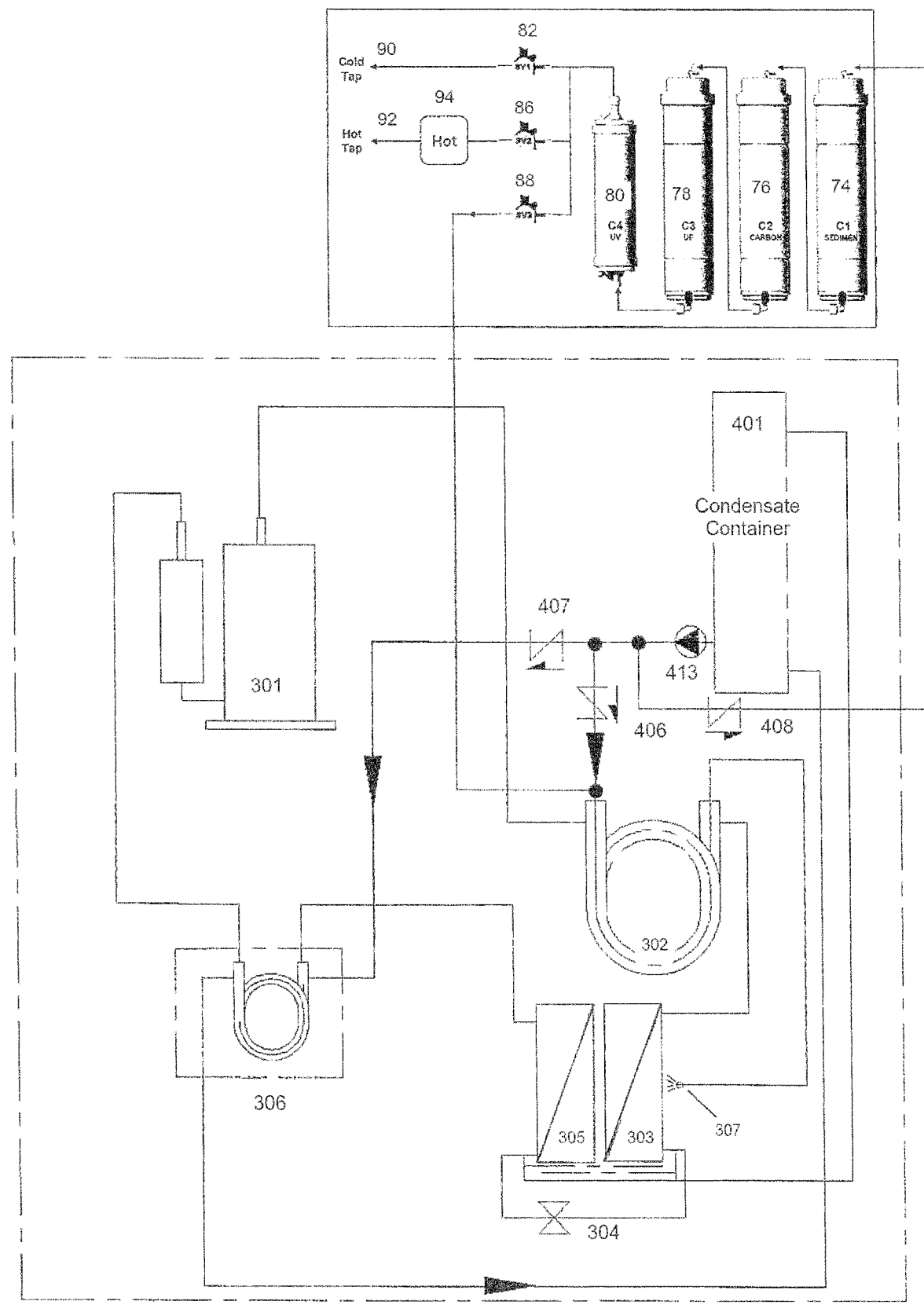
FIG. 10 is a system block diagram of the air-conditioner unit in accordance with various embodiments.

The above is a description of embodiments of systems and methods in accordance with the present invention. It is envisioned that those skilled in the art can design alternative embodiments of this invention that falls within the scope of the invention. In particular, it is to be appreciated that features from various embodiment(s) may be combined and/or permutated to form one or more additional embodiments. For example, FIG. 10 illustrates one embodiment that combines the technical features disclosed in the embodiments of FIG. 9 and FIG. 7: the filtered condensate, after passing through the filtration system (74, 76, 78 and 80), can be purged. The purged filtered and purified condensate can be further utilized by flowing into the first heat exchanger 302 to absorb the heat dissipated during the condensation of the compressed refrigerant.

The invention claimed is:

1. An air-conditioner unit comprising:
    a temperature regulation unit having an evaporator;
    a condensate filtration unit arranged to receive a condensate from the evaporator, and operable to filter the condensate;
    wherein the air-conditioner unit comprises a controller to operate the condensate filtration unit between a plurality of purging states, the plurality of purging states comprises a first purging state wherein the condensate is purged bypassing the condensate filtration unit and a second purging state wherein filtered condensate is purged and a third purging state corresponding to a maintenance mode,
    wherein the condensate filtration unit comprises a collection tank; and unpurified or unfiltered condensate received from the evaporator is utilized to clean the collection tank,
    wherein the condensate filtration unit is a water filtration unit and comprises a dispensing tank and a plurality of filters arranged to receive the condensate from the collection tank and direct the filtered condensate to the dispensing tank,
    wherein the controller is an electronic controller that operates to receive the following as inputs:
    a. a level of condensate stored in the collection tank; and
    b. a level of filtered condensate stored in the dispensing tank,
    the electronic controller operable to provide an output corresponding to the activation or opening of at least one valve,
    wherein the condensate filtration unit comprises a flow meter operable to obtain a total volume of condensate passing through the flow meter from a preset time as another input,
    wherein if the total volume of condensate passing through the flow meter is less than a first pre-fixed amount X, the controller operates the condensate filtration unit in the first purging state,
    wherein if the total volume of condensate passing through the flow meter is more than the first pre-fixed amount X but less than a second pre-fixed amount Y, the controller operates the condensate filtration unit in the second purging state,
    wherein if the total volume of condensate passing through the flow meter is more than a third pre-fixed amount Z, the controller operates the condensate filtration unit in the third purging state corresponding to the maintenance mode and sends a prompt to a user to change the condensate filtration unit, wherein if the total volume of condensate passing through the flow meter is more than the second pre-fixed amount Y but less than the third pre-fixed amount Z, the controller operates the condensate filtration unit in a dispensing state.

2. The air-conditioner unit according to claim 1, wherein the temperature regulation unit and the condensate filtration unit are shaped and dimensioned such that the condensate filtration unit is arranged below the temperature regulation unit.

3. The air-conditioner unit according to claim 1, wherein in the first purging state, the condensate from the collection tank is sent directly to a dispenser pump bypassing the plurality of filters, and in the second purging state, the condensate is sent to the plurality of filters.

4. The air-conditioner unit according to claim 1, wherein the temperature regulation unit comprises a second electronic controller and an electronic expansion valve throttling device, the second electronic controller operates to regulate the amount and state of refrigerant flowing pass the expansion valve throttling device.

5. The air-conditioner unit according to claim 1, wherein the temperature regulation unit further comprises a tray for collecting the condensate from the evaporator, and the condensate filtration unit further comprises at least one conduit connected to the tray and arranged to receive the condensate from the tray.

6. A method for obtaining condensate from the air-conditioner unit according to claim 1, the method comprising the steps of:
 a. collecting the condensate from the evaporator;
 b. directing the condensate via at least one conduit to the condensate filtration unit, the condensate filtration unit comprising a filter unit;
 c. operating the condensate filtration unit between the first purging state and the second purging state;
 wherein in the first purging state, the condensate is purged bypassing the filter unit; and wherein in the second purging state, the condensate is directed to pass the filter unit, and is purged.

7. An air-conditioner unit comprising:
 a compressor for compressing a refrigerant;
  a first heat exchanger arranged to receive the refrigerant from the compressor; an electronic expansion valve-throttling device arranged to receive the refrigerant flowing out of the first heat exchanger;
  an electronic controller operable to control the electronic expansion valve-throttling device to regulate the quantity of the refrigerant flowing through the expansion valve throttling device via adjustments of pressure and temperature,
  an evaporator arranged to receive the refrigerant from the electronic expansion valve-throttling device;
  a tray arranged to collect water condensate from the evaporator, and to direct the water condensate to a water source, wherein the water source is arranged to pass the water condensate to the first heat exchanger to remove heat from the refrigerant;
  the condensate filtration unit and the controller according to claim 1.

8. The air-conditioner unit according to claim 7, wherein the electronic controller is pre-programmed to regulate the refrigerant based on a plurality of modes depending on different priority.

9. The air-conditioner unit according to claim 7, wherein the air-conditioner unit is arranged to operate different modes depending on a quantity of water inside the water source; and the water source is configured to have at least a predetermined low level, a predetermined medium level and a predetermined high level for measuring the quantity of water.

10. The air-conditioner unit according to claim 9, wherein the evaporator is arranged to be connected to a second heat exchanger, wherein the refrigerant flows from the evaporator into the second heat exchanger and evaporates further inside the second heat exchanger.

11. A condensate filtration unit for use with a portable air-conditioner unit, comprising at least one conduit connected to a condensate container and arranged to receive condensate from the condensate container; the condensate filtration unit further comprising a filter unit arranged to receive and filter the condensate;
 wherein the condensate filtration unit comprises a controller to operate the condensate filtration unit between a plurality of purging states, the plurality of purging states comprises a first purging state wherein condensate is purged bypassing the filter unit and a second purging state wherein the filtered condensate is purged and a third purging state corresponding to a maintenance mode,
 wherein the condensate filtration unit comprises a collection tank; and unpurified or unfiltered condensate received from the condensate container is utilized to clean the collection tank,
 wherein the condensate filtration unit is a water filtration unit and comprises a dispensing tank and a plurality of filters arranged to receive the condensate from the collection tank and direct the filtered condensate to the dispensing tank,
 wherein the controller is an electronic controller that operates to receive the following as inputs:
 a. a level of condensate stored in the collection tank; and
 b. a level of filtered condensate stored in the dispensing tank,
 the electronic controller operable to provide an output corresponding to the activation or opening of at least one valve,
 wherein the condensate filtration unit comprises a flow meter operable to obtain a total volume of condensate passing through the flow meter from a preset time as another input,
 wherein if the total volume of condensate passing through the flow meter is less than a first pre-fixed amount X, the controller operates the condensate filtration unit in the first purging state,
 wherein if the total volume of condensate passing through the flow meter is more than the first pre-fixed amount X but less than a second pre-fixed amount Y, the controller operates the condensate filtration unit in the second purging state,
 wherein if the total volume of condensate passing through the flow meter is more than a third pre-fixed amount Z, the controller operates the condensate filtration unit in the third purging state corresponding to the maintenance mode and sends a prompt to a user to change the condensate filtration unit, wherein if the total volume of condensate passing through the flow meter is more than the second pre-fixed amount Y but less than the third pre-fixed amount Z, the controller operates the condensate filtration unit in a dispensing state.

* * * * *